(12) United States Patent
Sogabe et al.

(10) Patent No.: US 10,092,846 B2
(45) Date of Patent: Oct. 9, 2018

(54) GAME DEVICE, GAME SYSTEM, AND COMPUTER-READABLE STORAGE MEDIUM HAVING PROGRAM RECORDED THEREON

(71) Applicant: Konami Digital Entertainment Co., Ltd., Tokyo (JP)

(72) Inventors: Daisuke Sogabe, Tokyo (JP); Keiji Matsukita, Tokyo (JP); Yuji Kawakami, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 436 days.

(21) Appl. No.: 14/480,867

(22) Filed: Sep. 9, 2014

(65) Prior Publication Data

US 2015/0072745 A1    Mar. 12, 2015

(30) Foreign Application Priority Data

Sep. 10, 2013  (JP) ................................ 2013-187652

(51) Int. Cl.
| | |
|---|---|
| *A63F 9/24* | (2006.01) |
| *A63F 13/00* | (2014.01) |
| *G06F 17/00* | (2006.01) |
| *G06F 19/00* | (2018.01) |
| *A63F 13/812* | (2014.01) |
| *A63F 13/537* | (2014.01) |
| *A63F 13/573* | (2014.01) |

(52) U.S. Cl.
CPC .......... *A63F 13/812* (2014.09); *A63F 13/537* (2014.09); *A63F 13/573* (2014.09)

(58) Field of Classification Search
USPC .......................... 463/3, 5, 20, 22, 25, 31, 36
See application file for complete search history.

(56) References Cited

U.S. PATENT DOCUMENTS

| | | | |
|---|---|---|---|
| 2006/0128468 A1* | 6/2006 | Yoshikawa | ............. A63F 13/10 463/36 |
| 2007/0265088 A1* | 11/2007 | Nakada | ................... A63F 13/21 463/37 |
| 2008/0158436 A1* | 7/2008 | Chao | ..................... G06F 3/0325 348/734 |

(Continued)

FOREIGN PATENT DOCUMENTS

| | | |
|---|---|---|
| JP | 2004-248763 A | 9/2004 |
| JP | 2006-246968 A | 9/2006 |
| JP | 2011-072481 A | 4/2011 |

*Primary Examiner* — Adetokunbo O Torimiro
(74) *Attorney, Agent, or Firm* — Westerman, Hattori, Daniels & Adrian, LLP

(57) ABSTRACT

A game device for controlling a game in which a function is applied to a movable object by moving an aiming cursor to be superimposed on the movable object, includes a cursor moving unit for moving the aiming cursor according to a user's operation; a specific region setting unit for setting a specific region on a screen, in which the aiming cursor is movable; a cursor within region setting unit for setting a size of the aiming cursor within the specific region so as to change the size of the aiming cursor according to a location within the specific region; and a specific region moving unit for moving the specific region according to a user's operation before a movement of the movable object is started.

19 Claims, 22 Drawing Sheets

(56) References Cited

U.S. PATENT DOCUMENTS

| | | | |
|---|---|---|---|
| 2009/0011808 A1* | 1/2009 | Ikematsu | A63F 13/837 463/2 |
| 2012/0229377 A1* | 9/2012 | Kim | G06F 3/017 345/157 |
| 2013/0143653 A1* | 6/2013 | Yamaoka | A63F 13/10 463/31 |

* cited by examiner

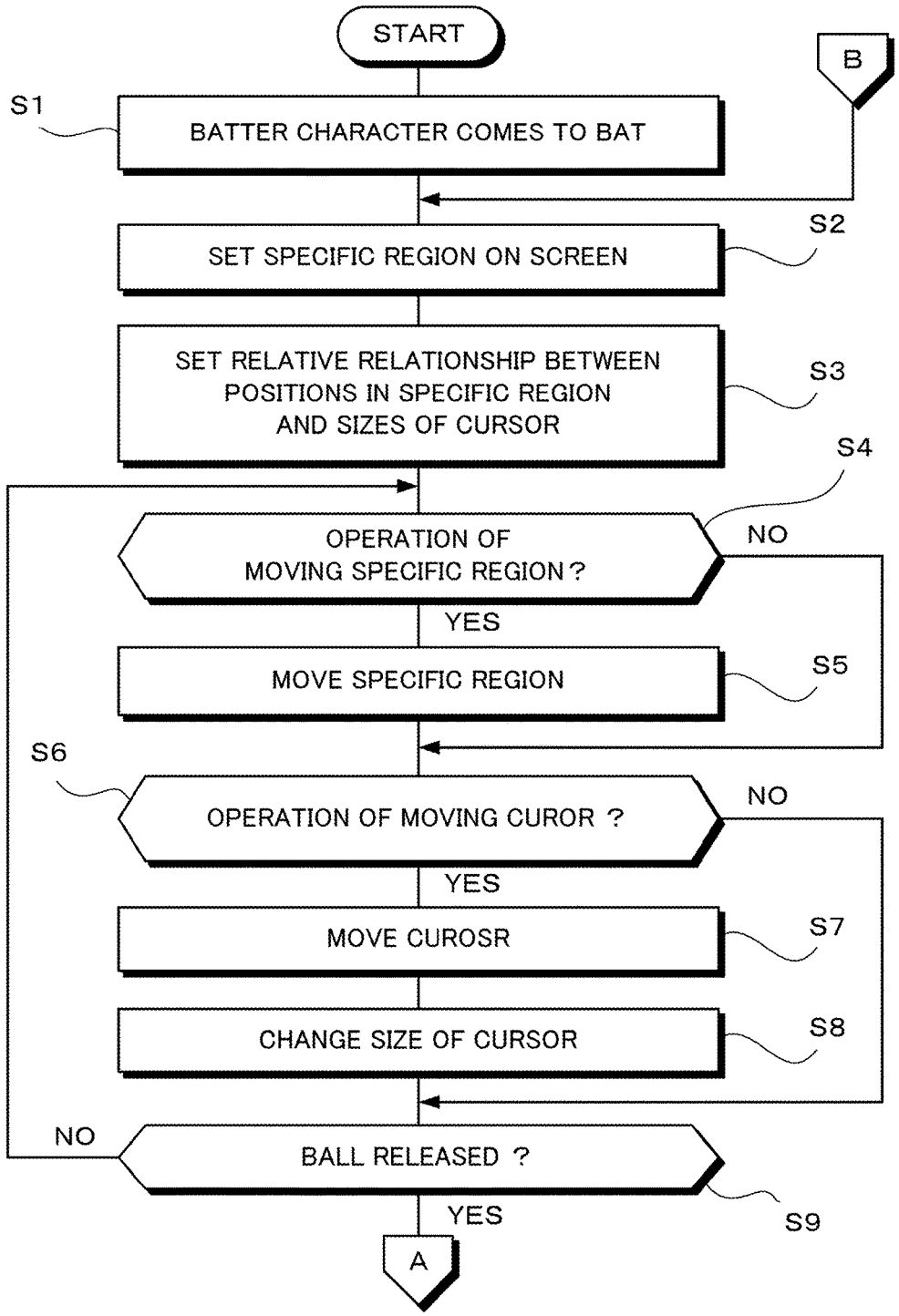

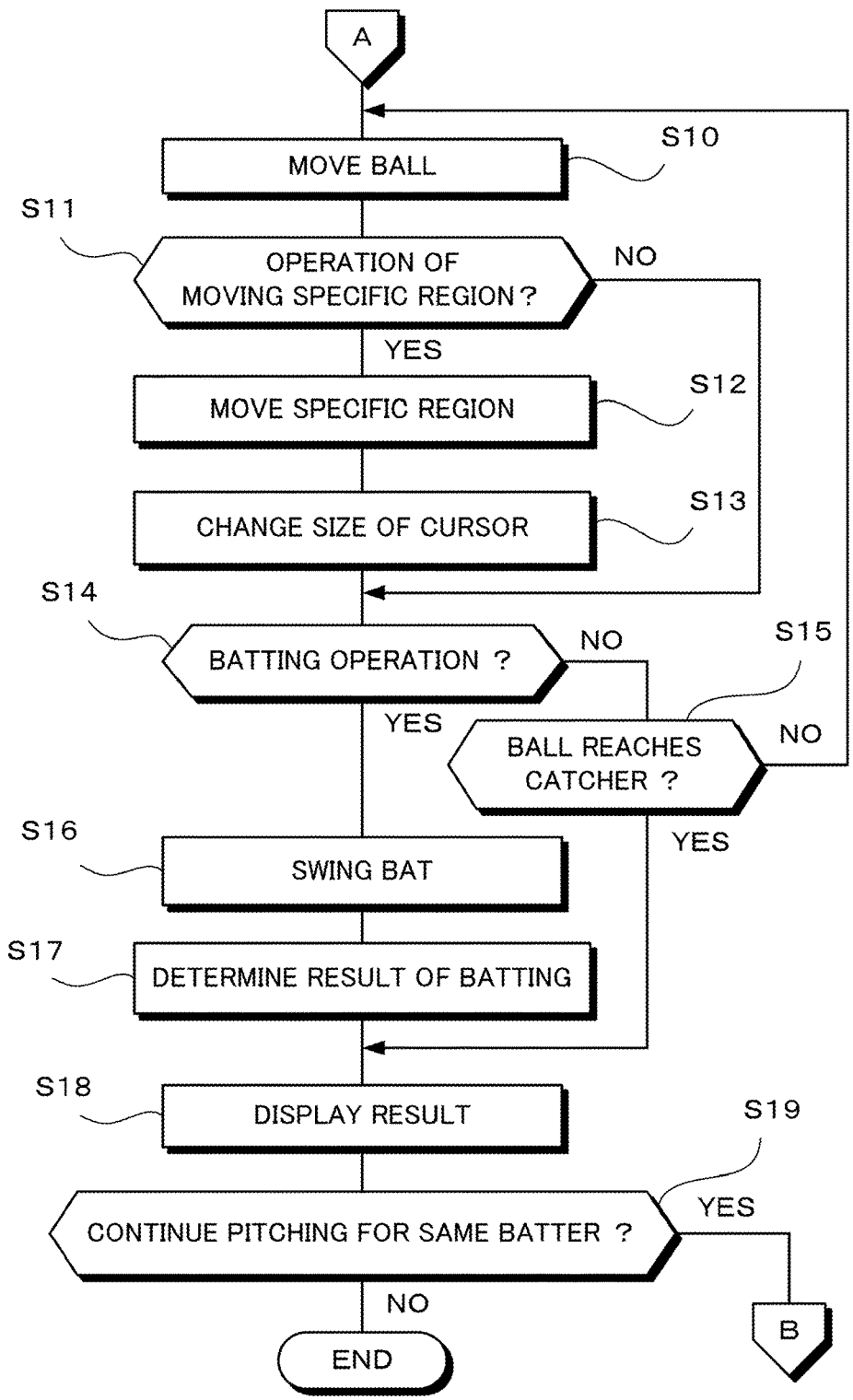

GAME DEVICE, GAME SYSTEM, AND COMPUTER-READABLE STORAGE MEDIUM HAVING PROGRAM RECORDED THEREON

CROSS-REFERENCE TO RELATED APPLICATION

This application is based upon and claims the benefit of priority from the prior Japanese Patent Application No. 2013-187652, filed on Sep. 10, 2013, the entire contents of which are incorporated herein by reference.

BACKGROUND OF THE INVENTION

1. Field of the Invention

The present invention relates to a game device, a game system, and a computer-readable recording medium having recorded thereon program, which controls a game based on user's operations.

2. Background Art

Conventionally, a baseball game is proposed in which a user on the batter side predicts a location of a pitched ball, wherein a ball pitched displaced from a strike zone can be hit by moving the position of a hittable region from the strike zone (refer to Japanese Laid-open Patent Publication No. 2011-72481).

Furthermore, in some conventional baseball games, for a support function of supporting an operation of hitting a ball on the batter side, a cursor called a meet cursor is provided. Here, when hitting a pitched ball, without any index, it would be extremely difficult to hit a ball which comes closer moment by moment with a bat while finding swing timing. In response, the meet cursor is provided as an index for supporting the user to perform a batting operation. Specifically, when a user moves the meet cursor to be superimposed on the pitched ball, and swings a bat in this state, the user can hit the pitched ball. Conventionally, this meet cursor has a fixed size irrespectively of the location of the strike zone, and the difficulty level of a batting operation is not changed according to the location of a pitched ball. However, in a baseball game of the real world, generally, it is easy to hit a pitched ball at a center portion of the strike zone but difficult to hit a pitched ball at an end portion of the strike zone, i.e., the difficulty level of a batting operation differs depending on the location of the pitched ball. In this regard, it cannot be said that conventionally, the reality related to the user's prediction on the location of the pitched ball is fully reflected to games.

SUMMARY OF THE INVENTION

An object of the present invention is to provide a game device, a game system, and a computer-readable storage medium having a program recorded thereon that can realize a game with high amusement properties by reflecting the user's prediction realistically.

A game device according to one aspect of the present invention is a game device for controlling a game in which a function is applied to a movable object by superimposing an aiming cursor on the movable object, the game device comprising: a cursor moving unit for moving the aiming cursor according to a user's operation; a specific region setting unit for setting a specific region on a screen, in which the aiming cursor is movable; a cursor within region setting unit for setting a size of the aiming cursor within the specific region so as to change the size of the aiming cursor according to a location of the aiming cursor within the specific region; and a specific region moving unit for moving the specific region according to a user's operation before a movement of the movable object is started.

A game system according to yet another aspect of the present invention is a game system which comprises a terminal device used by a first user uses and a terminal device used by a second user, and which controls a game in which a function is applied to a movable object operated by the second user by making an aiming cursor operated by the first user superimpose on the movable object, the game system comprising: a cursor moving unit for moving the aiming cursor according to a first user's operation; a specific region setting unit for setting a specific region on a screen, in which the aiming cursor is movable; a cursor within region setting unit for setting a size of the aiming cursor within the specific region so as to change the size of the aiming cursor according to a location of the aiming cursor within the specific region; and a specific region moving unit for moving the specific region according to a first user's operation before a movement of the movable object is started.

The game device and the game system according to the present invention can also be realized by a computer, in that case, by causing the computer to function as the foregoing respective units, a program and a computer-readable storage medium having recorded thereon the program, that enable the foregoing game device and the game system by means of a computer would fall under the scope of the present invention.

The object, characteristics and advantages of the present invention become more evident by the detailed explanation and the attached diagrams below.

BRIEF DESCRIPTION OF THE DRAWINGS

FIG. 20 is a flowchart illustrating an example of the operation of the game device.

FIG. 21 is a flowchart illustrating an example of the operation of the game device.

BEST MODE FOR CARRYING OUT THE INVENTION

In the following, a game device, a game system, and a computer-readable recording medium having recorded thereon program, according to one embodiment of the present invention are described with reference to the accompanying drawings.

[Outline of Game Device]

A game device 100 according to an embodiment of the present invention is applicable to various types of information processing devices which can execute a game program. For the game device, applied may be, for instance, portable or stationary type game-dedicated devices, personal computers (hereinafter referred to as "PCs"), tablet-type computers, smartphones, portable phone terminals, PHS (Personal Handy-phone System) terminals, portable digital assistant (PDA) terminals, multifunctional television receivers provided with an information processing function (so-called smart televisions), and the like.

The game controlled by the game device according to this embodiment is a game in which an action is exerted onto a movable object (for instance, hitting back the movable object, catching the movable object, breaking the movable object into pieces) by superimposing thereon an aiming cursor. As an example, the above game can be a game in which a first character operated by a user exerts an action onto the movable object sent from a second character. Examples of such games includes baseball or softball games in which a batter character as an example of the first character adjusts the aiming cursor onto a ball as an example of the movable object, released from the pitcher character as an example of the second character, and then hits the ball as an example of the action.

The game device 100 according to this embodiment is applicable to not only the baseball or softball games but also various other games in which some action is exerted onto the movable object, such as soccer games, tennis games, and the like. In the following, explanations will be given through an example in which the game device 100 is applied to the baseball game.

Figure 5:
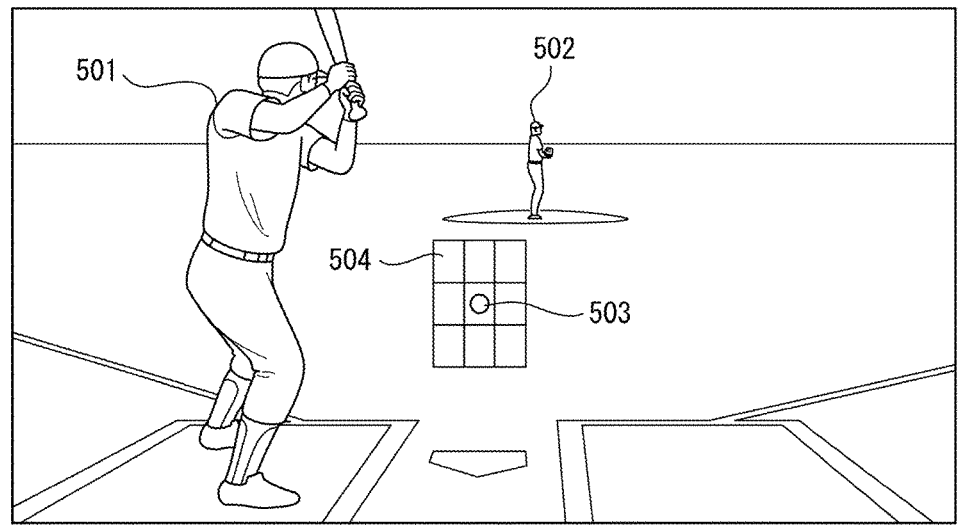
FIG. 5 is an explanatory diagram illustrating an example of a game screen before a specific region is set.

FIG. 5 shows an example of the game screen of the baseball game. In this game screen, displayed are a batter character 501 operated by a user, a pitcher character 502 of an opponent user, an aiming cursor 503, a strike zone 504 and the like. In the baseball game, the aiming cursor is also referred to as a meet cursor, indicating a region in which a ball can be hit by the batter character. Additionally, when an operation of swinging a bat is performed in the state where the ball object is superimposed onto the center portion (center) of the aiming cursor 503, it is likely to produce an effective batting, i.e., hitting for extra bases or a home run.

The user who operates the batter character 501 performs an operation of moving the aiming cursor 503 so that the aiming cursor 503 is superimposed onto a ball object (hereinafter referred to simply as a "ball"). According to the user's operation, the game device moves the aiming cursor 503 on the screen. The user is allowed to adjust the position of swinging the bat object by moving the aiming cursor 503.

Here, the size of the aiming cursor 503 is not fixed, but is changed according to the location (coordinate) on the screen as shown below.

Figure 6:
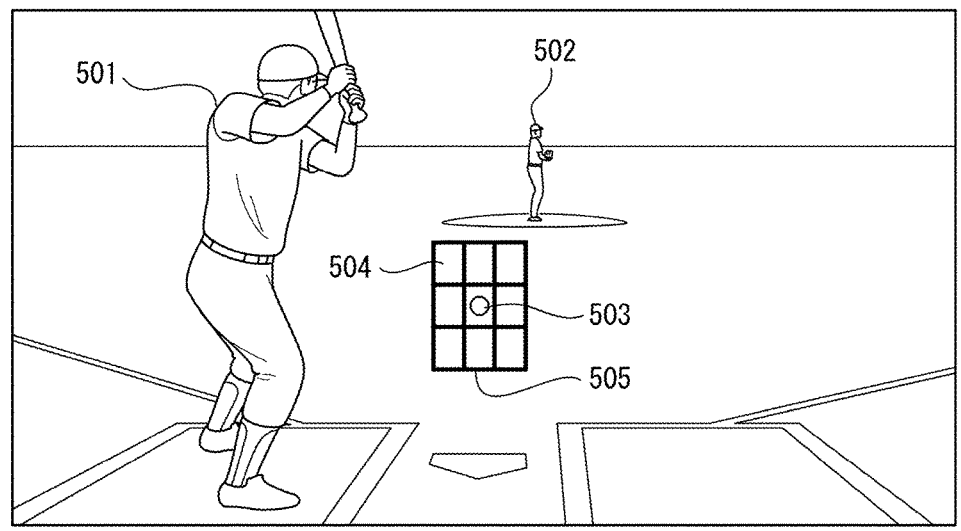
FIG. 6 is an explanatory diagram illustrating an example of the game screen where a specific region is set.

As shown in FIG. 6, this game device sets on the screen, the specific region 505 with the aiming cursor 503 that is movable. The specific region 505 has a different concept from the conventional strike zone, which enables a prediction on the location of a pitched ball on the batter character side in the game as described later. The position on the screen of this specific region 505 can be set arbitrarily. For instance, the specific region 505 can be initialized at the position of the strike zone 504. In FIG. 6, shown is an example in which the specific region 505 is initialized to coincide with the strike zone 504.

The size (area) of the specific region 505 can be set arbitrarily, which can be set larger or smaller than the strike zone 504. Furthermore, the aiming cursor 503 may be configured to be movable also to the outside of the specific region 505, or to be unmovable to the outside of the specific region 505.

Figure 7:
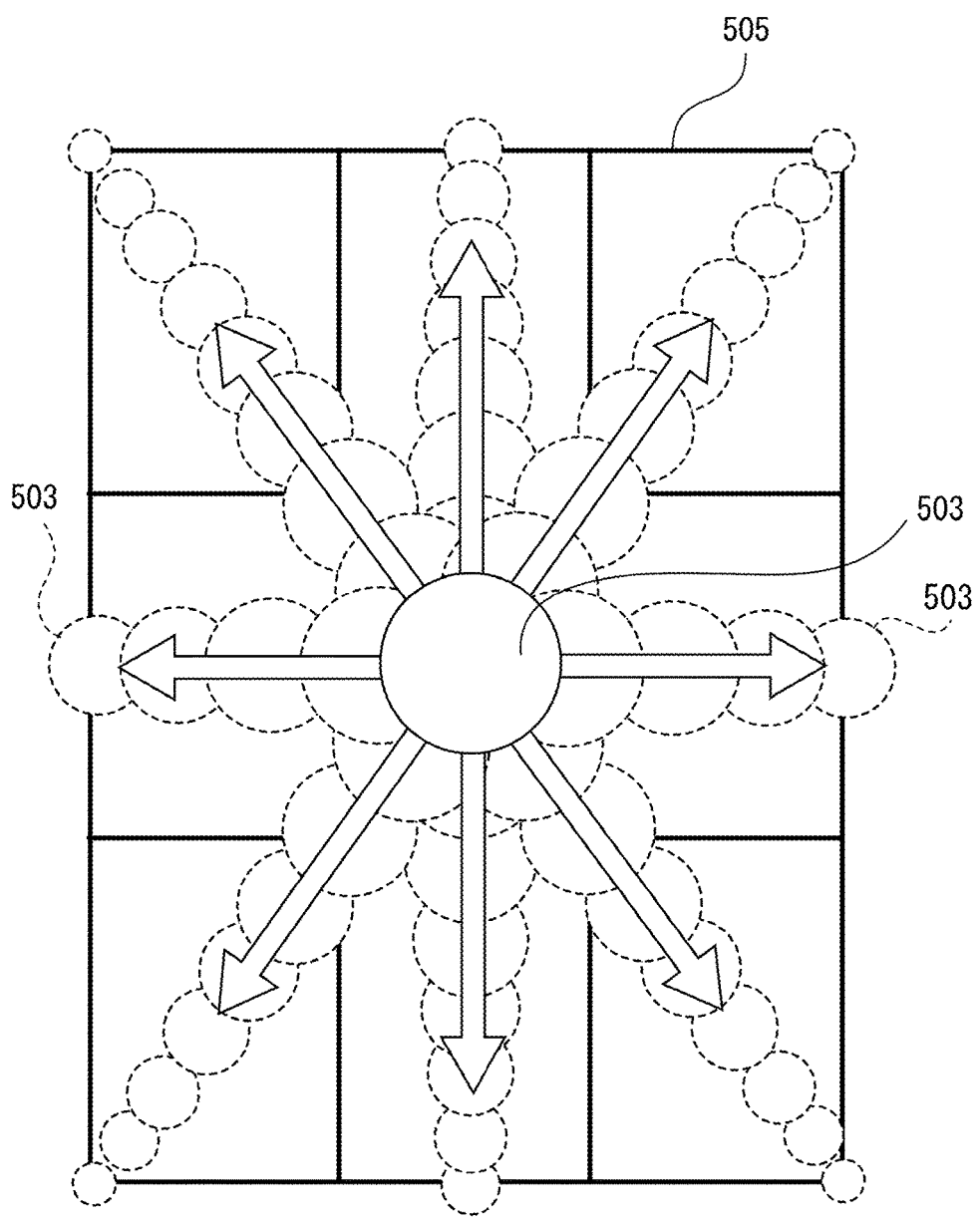
FIG. 7 is an explanatory diagram illustrating an example of the setting of size distribution of an aiming cursor within the specific region.

Then, the game device sets the size of the aiming cursor 503 within the specific region 505 so as to change the size of the aiming cursor 503 according to the location of the aiming cursor 503 within the specific region 505. For instance, it may be set so that the aiming cursor 503 becomes larger as it moves towards the center portion of the specific region 505, and becomes smaller as it moves away from the center portion. With this configuration, as shown in FIG. 7, when moving the aiming cursor 503 at the center portion in various directions, as shown by the dotted line, the aiming cursor 503 becomes smaller continuously (or step by step) as it moves closer to the outer periphery of the specific region 505. In the baseball game in the real world, generally, it is easy to hit a ball pitched at the center portion of the strike zone 504, while it is difficult to hit a ball pitched at an end portion of the strike zone 504. According to the configuration, the above condition is appropriately reflected to games. In FIG. 7, for the directions of moving the aiming cursor 503, only eight directions of up, down, left, right, upper right, lower right, upper left and lower left directions are shown. However, the user is allowed to move the aiming cursor 503 in an arbitrary direction.

Figure 8:
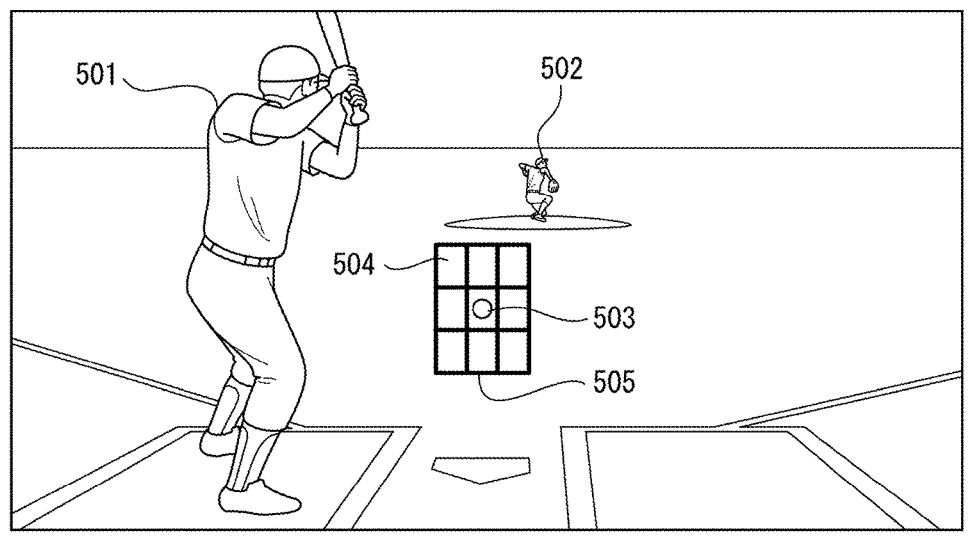
FIG. 8 is an explanatory diagram illustrating an example of the game screen where the specific region is set to the position of a strike zone.
Figure 9:
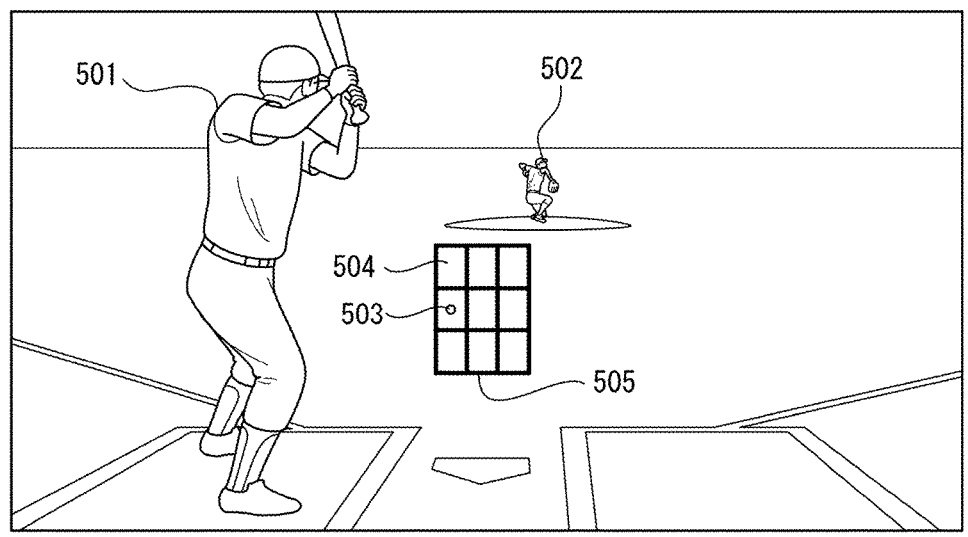
FIG. 9 is an explanatory diagram illustrating an example of the game screen where the specific region is set to the position of the strike zone.

According to the setting of the size distribution of the aiming cursor 503 within the specific region 505 shown in FIG. 7, as illustrated in FIG. 8, the aiming cursor 503 that locates at the center portion of the strike zone 504 has the maximum size. In this case, since it is easy to superimpose the aiming cursor 503 onto a ball, it is easy for the user to operate the batter character 501 to hit a middle pitch, i.e., a ball pitched at the center portion of the strike zone 504. On the other hand, as illustrated in FIG. 9, the aiming cursor 503 that is moved away from the center of the strike zone 504 has a smaller size than the size of the aiming cursor 503 at the center portion shown in FIG. 8. In this case, since it becomes difficult to superimpose the aiming cursor 503 onto the ball, it becomes difficult for the user to operate the batter character 501 to hit a pitched ball.

By the way, when seen from the pitcher character side, an advantageous condition can be generated simply by aiming an end portion of the strike zone. However, only the pitcher character side would have an advantage without any countermeasure. In response, the game device according to this embodiment is configured to allow a user to move the specific region 505 by the user's operation in addition to the concept of the prediction on the location of a pitched ball on the batter character side.

Figure 10:
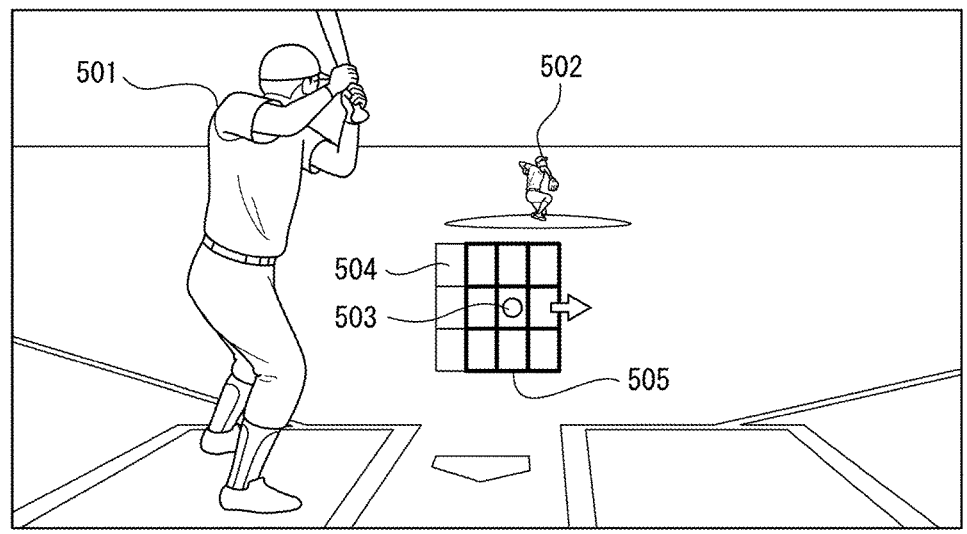
FIG. 10 is an explanatory diagram illustrating an example of the game screen where the specific region is moved to the outside.

Namely, a user is allowed to make a prediction on the location of a pitched ball before the ball is released from the pitcher character 502 and to move the specific region 505 to the position shifted from the strike zone 504. For instance, when the user predicts the location of a pitched ball to be an outside location, the user can move the specific region 505 to the outside. Irrespectively of the movement of the specific region 505 on the screen, the setting made in the inside of the specific region 505 (the setting of the size of the aiming cursor 503 which is changed according to the location of the aiming cursor 503 within the region) is basically maintained. Therefore, as illustrated in FIG. 10, when moving the specific region 505 to the position where the center portion thereof is positioned outside, the size of the aiming cursor 503 which locates in the outside portion of the specific region 505 before being moved is maximized. Therefore, a user can perform a batting operation of hitting an outside pitch as if a batting operation of hitting a middle pitch, i.e., a ball pitched at the center portion of the strike zone 504. Namely, by moving the specific region 505 to the outside, it becomes possible for the user to perform a batting operation while expecting an outside pitch.

Figure 11:
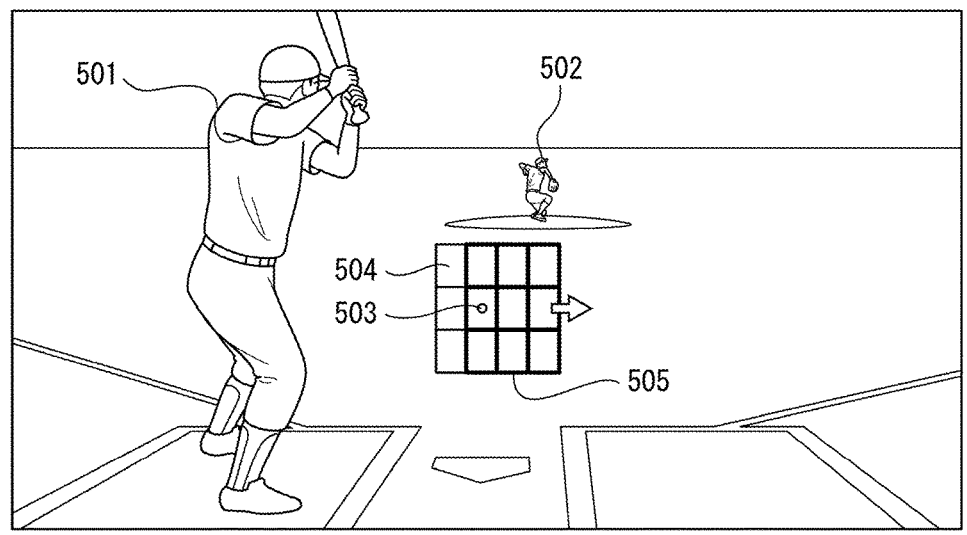
FIG. 11 is an explanatory diagram illustrating an example of the game screen where the specific region is moved to the outside.

On the contrary, when the specific region 505 is moved to the position at which the center portion of the specific region 505 is moved to the outside from the initial position, as illustrated in FIG. 11, the size of the aiming cursor 503 becomes smaller at the center portion. Therefore, the user finds it difficult to hit a middle pitch.

Figure 12:
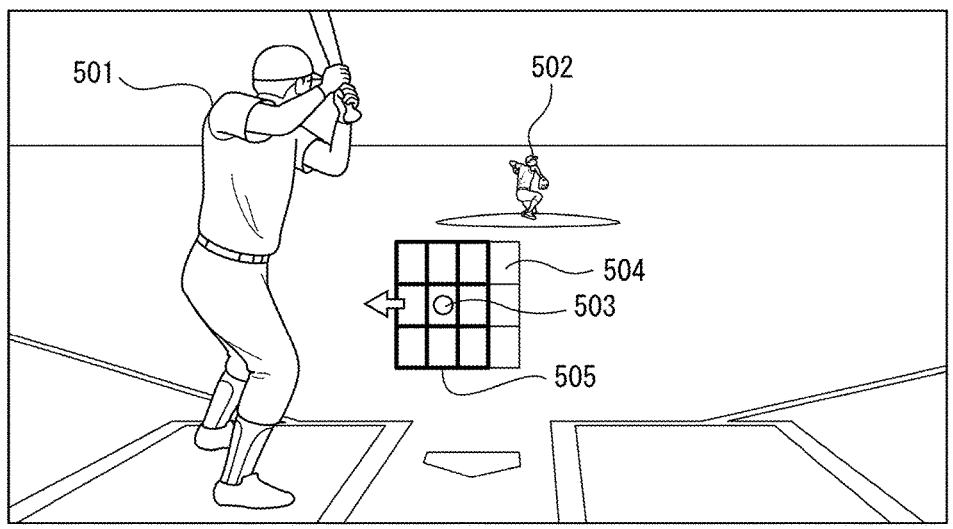
FIG. 12 is an explanatory diagram illustrating an example of the game screen where the specific region is moved to the inside.
Figure 13:
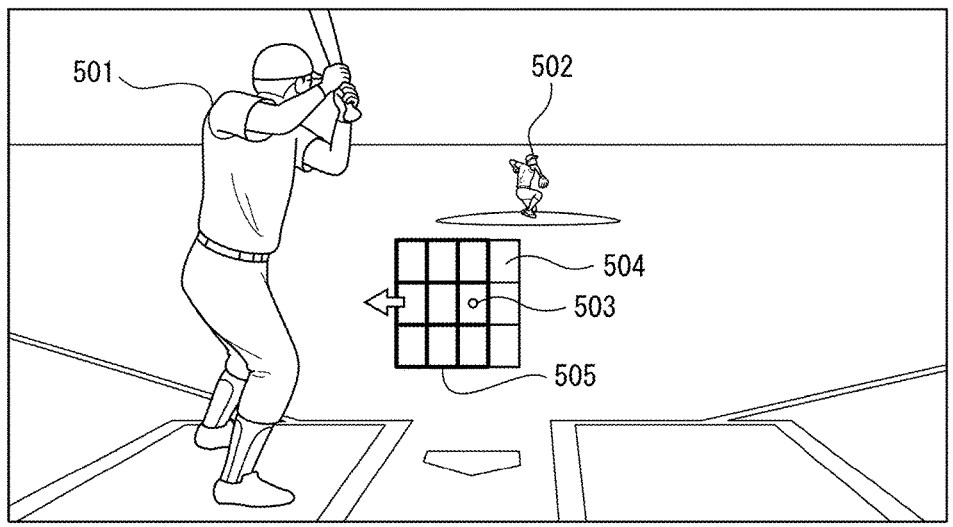
FIG. 13 is an explanatory diagram illustrating an example of the game screen where the specific region is moved to the inside.

Similarly, as illustrated in FIG. 12, when the user predicts the location of a pitched ball to be an inside location, and moves the specific region 505 to the inside, the size of the aiming cursor 503 that locates in an inside portion of the specific region 505 at the initial position is maximized. Therefore, it becomes possible for a user to perform a batting operation to hit an inside pitch as if a batting operation to hit a middle pitch, i.e., a ball pitched at the center portion of the strike zone 504. On the contrary, as illustrated in FIG. 13, the size of the aiming cursor 503 that locates at the center portion of the specific region 505 at the initial position becomes smaller. Therefore, the user finds it difficult to hit a middle pitch.

Namely, if the user's prediction on the location of a pitched ball is correct, the user will find it easy to hit the pitched ball at the end portion of the strike zone 504 which is originally disadvantageous for a batter. Therefore, it is possible to avoid such undesirable condition that only the pitcher character side will have an advantage, and it is therefore possible to more precisely and realistically reflect the tactics between the pitcher and the batter in the real world to games.

[Configuration of Game Device]

Figure 1:
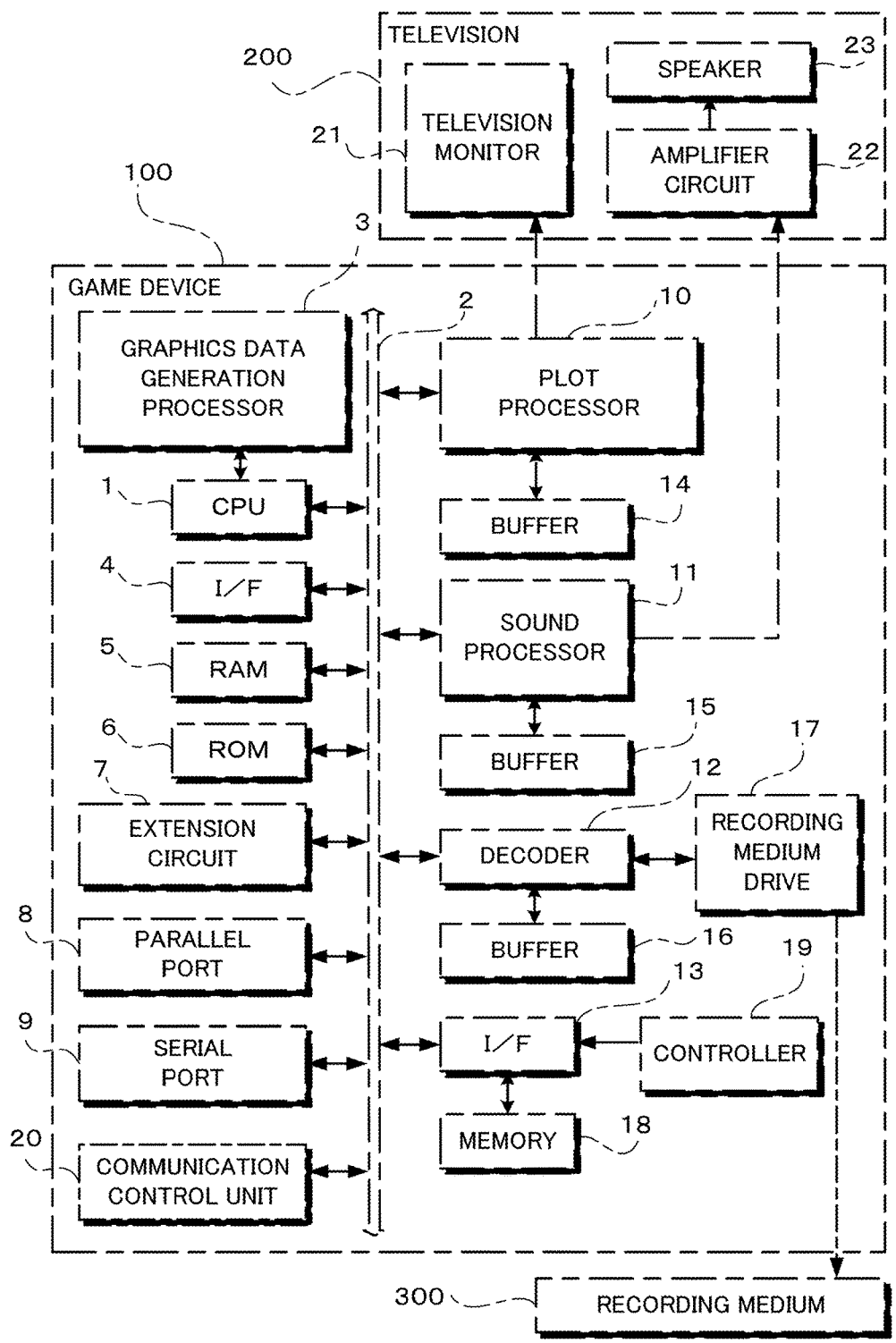
FIG. 1 is a block diagram illustrating a hardware configuration of a game device according to one embodiment of the present invention.

FIG. 1 is a block diagram showing a configuration of a game device 100 according to an embodiment of the present invention. As one example of the game device 100, the following explanations will be given through the case of a game device constituted by connecting a home video game device to a home television 200. A computer readable recording medium 300 having recorded thereon a game program is mounted in the game device 100, and the game program is read out as necessary from the recording medium 300, whereby the game is executed.

The game device 100 includes a CPU (Central Processing Unit) 1, a bus line 2, a graphics data generation processor 3, an interface circuit (I/F) 4, a RAM (Random Access Memory) 5, a ROM (Read Only Memory) 6, an decompression circuit 7, a parallel port 8, a serial port 9, a plot processor 10, a sound processor 11, a decoder 12, an interface circuit (I/F) 13, buffers 14 to 16, a recording medium drive 17, a memory 18 and a controller 19. The television 200, to which this game device 100 is connected, includes a television monitor 21, an amplifier circuit 22 and a speaker 23.

The CPU 1 is connected to the bus line 2 and the graphics data generation processor 3. The bus line 2 includes an address bus, a data bus, a control bus and the like. Via this bus line 2, the CPU 1, the interface circuit 4, the RAM 5, the ROM 6, the decompression circuit 7, the parallel port 8, the serial port 9, the drawing processor 10, the sound processor 11, the decoder 12, the interface circuit 13 and a communication control unit 20 are mutually connected.

The drawing processor 10 is connected to the buffer 14 and the television monitor 21. The sound processor 11 is connected to the buffer 15 and the amplifier circuit 22 of the television 200. The decoder 12 is connected to the buffer 16 and the recording medium drive 17. The interface circuit 13 is connected to the memory 18 and the controller 19.

In the case where the game device 100 is constituted by a personal computer or a work station, the television monitor 21 and the like correspond to a display for a computer. Furthermore, the decompression circuit 7, the drawing processor 10, the sound processor 11 and the like respectively correspond to parts of the data of the game control program recorded in the recording medium 300, or the hardware on the expansion board mounted on the expansion slot of the computer. The interface circuit 4, the parallel port 8, the serial port 9 and the interface circuit 13 correspond to the hardware on the expansion board mounted to the expansion slot of the computer. The buffers 14 to 16 respectively correspond to the respective storage areas of the RAM 5 or the expansion memory.

The graphics data generation processor 3 plays the role of coprocessor of CPU 1. In other words, this graphics data generation processor 3 performs coordinate transformation and light source calculation, such as fixed point matrix and vector operations, by parallel processing. The major processing of this graphics data generation processor 3 involves processing to determine the address of the processing target image in a predetermined display area based on the coordinate data, the moving amount data and the rotation amount data of each vertex in a 2-D or 3-D space of the image data supplied from the CPU 1, and to return this address data to the CPU 1, and processing to calculate the luminance of the image based on the distance from the light source, which is set virtually.

The interface circuit 4 is used for interfacing the peripheral devices and a pointing device, such as a mouse, a trackball or the like. The RAM 5 is used as the main memory. In the ROM 6, stored are the program data and the like required for the operating system of the game device 100.

The decompression circuit 7 performs decompression processing for compressed images which were compressed by intra-encoding conforming to the MPEG (Moving Picture Experts Group) standard for moving pictures and to the JPEG (Joint Photographic Experts Group) standard for still pictures. Decompression processing includes decoding processing (decoding data encoded by VLC: Variable Length Code), inverse quantization processing, IDCT (Inverse Discrete Cosine Transform) processing, and restoration processing of intra-images.

The drawing processor 10 performs drawing processing for the buffer 14 at each predetermined time (for example, 1 frame, e.g. 1/60 sec.) based on the drawing instructions issued by the CPU 1. The buffer 14 is comprised of RAM, for example, and consists of a display area (frame buffer) and a non-display area. The display area is a development area for data to be displayed on the display screen of the television monitor 21. The non-display area is a storage area for data to define skeletons, model data to define polygons, animation data to assign motion to models, pattern data to indicate the content of each animation, texture data and color palette data. Here the texture data is 2-D image data. The color palette data is data for specifying the color of texture data. The CPU 1 reads out these data from the recording medium 300 all at once, or at a plurality of times along with the progress of a game to be recorded in the non-display area of the buffer 14 beforehand.

The sound processor 11 writes ADPCM (Adaptive Differential Pulse Code Modulation) data read from the recording medium 300 to the buffer 15, and the ADPCM data stored in this buffer 15 is used as the sound source. This sound processor 11 reads the ADPCM data from the buffer 15 based on a clock signal with a 44.1 kHz frequency, for instance. The sound processor 11 performs such processing as pitch transformation, adding noise, setting an envelope, setting level, and adding reverb, for the ADPCM data read from the buffer 15. When the sound data read from the recording medium 300 is PCM data such as CD-DA (Compact Disk Digital Audio), the sound data is converted to ADPCM data by the sound processor 11. The sound data processed by the sound processor 11 is then output from the speaker 23 via the amplifier circuit 22.

For example, the recording medium drive 17 is made up of a DVD-ROM drive, a CD-ROM drive, a hard disk drive, an optical disk drive, a flexible disk drive, a silicon disk drive, a cassette medium reading device, etc. The recording medium 300 is made up of a DVD-ROM, a CD-ROM, a hard disk, an optical disc, a flexible disk or a semiconductor memory, etc. The recording medium drive 17 reads the image data, the audio data, and the program data from the recording medium 300, and supplies these data as read to the decoder 12. The decoder 12 performs an error correction processing based on the ECC (Error Correction Code) for the image data, the audio data, and the program data supplied from the recording medium drive 17, and supplies the data as processed to the RAM 5 or the sound processor 11.

The memory 18 is an auxiliary memory device, which has a nonvolatile storage region for storing therein various game parameters at a point of interruption, such as the case of holding the status at a point of interruption when the game is interrupted midway. The memory 18 can store game program or various kinds of data. For this memory 18, for example, a card type memory, a hard disk, etc. can be used.

The controller 19 is an operation device which permits the user as an operator to input various types of operation commands. The controller 19 outputs an operation signal to the CPU 1 via the interface circuit 13 according to an operation by the user. The controller 19 is provided with, for instance, an analog stick, a direction key, a confirm button and the like. The controller 19 is used for providing the CPU 1 with commands for moving the specific region 505 and the aiming cursor 503, or executing the batting operation by the batter character 501.

Next, the general operation of the game device 100 will now be explained. When the power is supplied to the game device 100, on the basis of the operating system stored in the ROM 6, the CPU 1 instructs the recording medium drive 17 to read the game program from the recording medium 300. When the power of the game device 100 is turned ON, on the basis of the operating system stored in in the ROM 6, the CPU 1 instructs the recording medium drive 17 to read a game program from a recording medium 300. Then, the image data, sound data and program data read out from the recording medium 300 by the recording medium drive 17 are supplied to the decoder 12, and the decoder 12 executes error correction processing for each data.

The image data to which the error correction processing has been performed, is supplied to the decompression circuit 7 via the bus line 2, and the above mentioned expansion processing is performed. The image data is then supplied to the drawing processor 10, and is written to the non-display area of the buffer 14 by the drawing processor 10. The sound data, to which the decoder 12 performed the error correction processing, is written to the buffer 15 via the RAM 5 or the sound processor 11. The program data, to which the decoder 12 performed the error correction processing, is written to the RAM 5.

Therefore, the CPU 1 performs a player card exchange processing, a game progress processing, and the like based on the game control program stored in the RAM 5 and the content which the user instructs using the controller 19. In other words, the CPU 1 controls image processing, controls sound processing, and controls internal processing based on the content which the user instructs using the controller 19.

The game device 100 comprises the communication control unit 20 including a communication interface, and it is also possible to execute an on-line competitive game by connecting to the other game device 100 by a wireless LAN communication, an internet communication, a near field communication, a cable communication, or the like, and carrying out sending and receiving of data while making the game devices in sync with one another.

Figure 2:
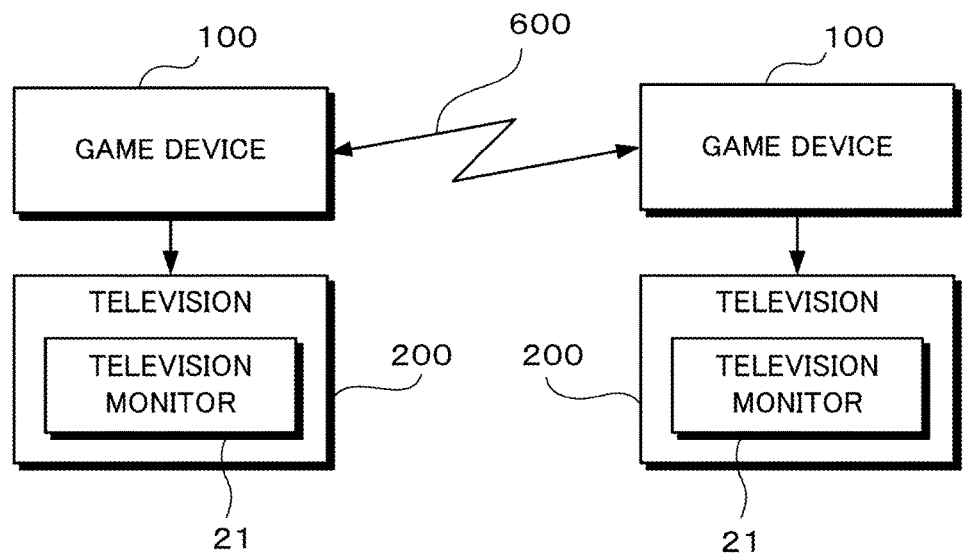
FIG. 2 is a block diagram illustrating a configuration of a game system.
Figure 3:
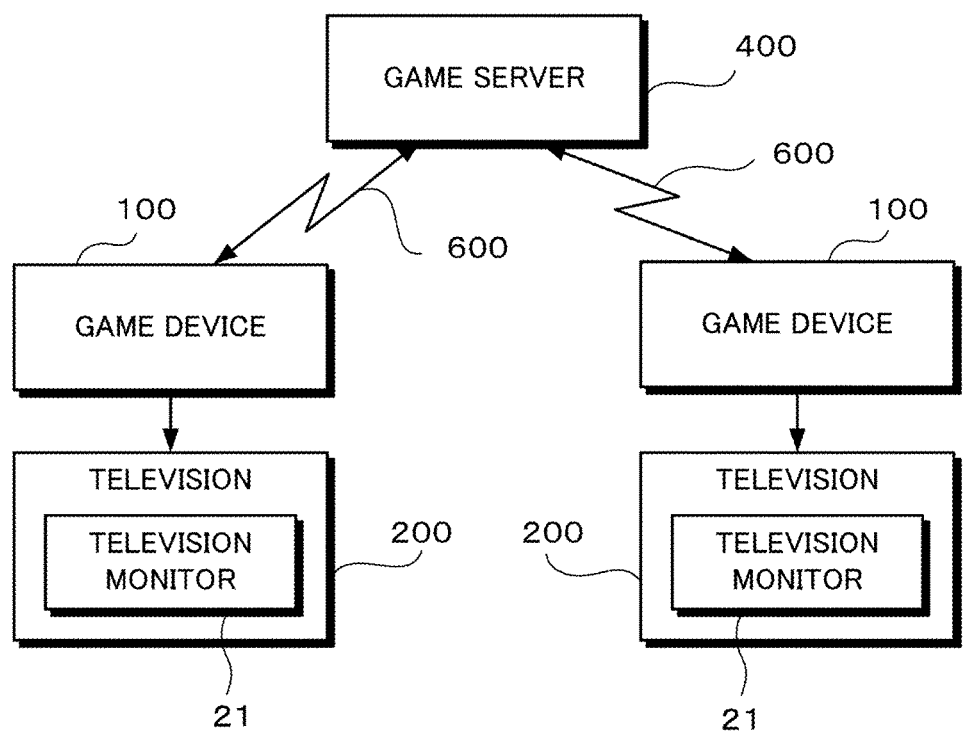
FIG. 3 is a block diagram illustrating another configuration of the game system.

In the case where two users make an online competition via a network as shown in FIG. 2 and FIG. 3, two game devices 100 respectively operated by the two users are connected so as to allow communications via a network 600. For the network 600, an internet, a public line (telephone line, mobile communication line and the like), a cable LAN (Local Area Network), a wireless LAN, Bluetooth (registered trademark), a UWB (Ultra Wide Band) and the like, or combinations thereof may be used.

For the online competition via the network, a game system in which a competition is made among a plurality of game devices by making direct data exchanges among them, a so-called P2P (peer to peer) connection system may be adopted. Moreover, a radio-communication competition in ad hoc mode which permits a plurality of game devices to directly perform radio-communications, or a telecommunication competition via communication cable may be adopted, which fall under the P2P connection system. In the online competition, for example, two game devices 100 develop a common virtual game space, while making synchronization with one another by the P2P communications, and the game proceeds in the virtual game space.

For the online competition system via the network 600, as show in FIG. 3, a so-called client/server connection system may be adopted in which a plurality of game devices 100 as clients compete against each other via a server device 400. Namely, the competitive game in which a ball thrown by the pitching character is hit by a batter character is carried out between the two game devices 100 while making communications between them, and the communications may be performed via the server device 400.

The game according to this embodiment also has a game mode in which a user carries out a match with a computer (so-called a CPU competition) other than a game mode in which the user carries out an on-line match via the network. In the following, explanations are given on the game which realizes the above mainly through the case of the game mode of the on-line competition.

In the following, the configuration of the game device which realizes the above game is explained.

[Outline of Game]

Figure 14:
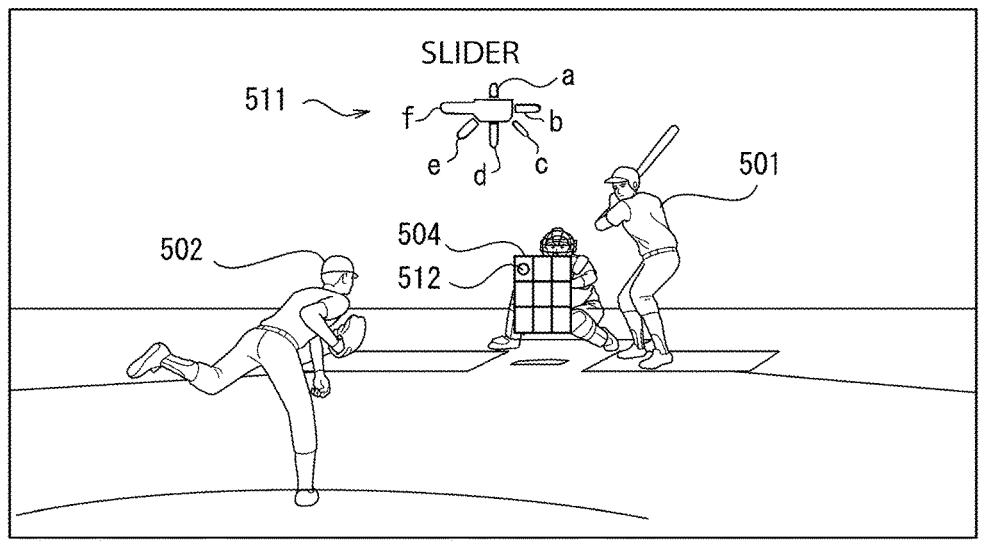
FIG. 14 is an explanatory diagram illustrating an example of the game screen on the side where a pitcher character is operated.

As shown in FIG. 2 and FIG. 3, in the case where two users compete against one another via the network, the screen of FIG. 6 and the screen of FIG. 14 are displayed in the television monitors 21 of the televisions 200 connected to two game devices 100 respectively. Namely, the screen of FIG. 6 is displayed in the television monitor 21 of the game device 100 on the side of a user operating the batter character 501, while the screen of FIG. 14 is shown in the television monitor 21 of the game device 100 on the side of a user operating the pitcher character 502.

FIG. 14 shows the state directly after the pitcher character 502 throws a ball to a batter character 501. FIG. 14 shows an image when the batter character side is seen from the pitcher character side. The user operating the pitcher character performs a game while viewing this screen when making a match between a batter and a pitcher. The user on the pitcher character side is allowed to select a pitch type and a location of a pitched ball. For instance, a pitch selection icon 511 is displayed on the screen. The user selects a pitch type by operating the controller 19 (analog stick, cursor key or the like), and confirms the selection of the pitch type by pressing a determination button.

In the example of the pitch selection icon 511 shown in FIG. 14, six lines a, b, c, d, e and f extend from the center to the surrounding, one pitch type can be selected from among the six pitch types. For instance, the line a indicates "Fastball", the line b indicates "Screw", the line c indicates "Sinker", the line d indicates "Fork", and the line e indicates "Curve", and the line f indicates "Slider". In the example shown in FIG. 14, a pitch type can be selected from among the six pitch types. However, the number of selectable pitch types is different for each pitching character 502, and there may be the cases where only two to five pitch types are selectable. The pitch type selected by the user's operation is displayed in the area above the pitch selection icon 511.

When the pitch type is determined in the above-mentioned manner, the pitcher character 502 enters into a throwing motion. Thereafter, for instance, before the pitcher character 502 releases a ball, the user can specify the location of a pitched ball. On the screen, displayed are the strike zone 504 and a location designation cursor 512 for specifying the strike zone 504 and the location of a pitched ball. For instance, the user can move the location designation cursor 512 by operating the controller 19 (analog stick, cursor key or the like), and the location of a pitched ball is designated. For instance, the user can move the location designation cursor 512 by operating the controller 19 (analog stick, cursor key or the like), and the location of a pitched ball is designated.

For the game device 100 of the screen integrated type, in the case of adopting a touch panel for the screen, it may be configured such that the user can designate the location of a pitched ball by touching the screen with his/her finger or a stylus.

After designating the pitch type in the above-mentioned manner, the pitcher character 502 starts pitching and releases a ball. In FIG. 14, the strike zone 504, the pitch selection icon 511 and location designation cursor 512 are displayed for convenience' sake. However, it may be configured, for instance to hide them after the ball is released.

The game device 100 calculates the track of the ball released by the pitcher character 502 on the basis of the pitch and the location of a pitched ball selected by the user on the pitcher character side, and moves the ball towards the home base. The game device 100 may be configured to calculate the track of the ball released by the pitcher character 502 on the basis of not only the pitch type and the location of the pitched ball but also the ability parameter of the pitcher character 502 (ball speed, control, change level and the like.). For the calculation of the track of the ball, the known algorithm may be applied.

In the above, the example in which a user on the pitcher character side selects the pitch and the location of a pitched ball has been explained. However, the baseball game may be configured such that a user only needs to select the location of a pitched ball to start a pitching operation by the pitcher character 502, to realize a simpler baseball game.

By the way, since the user who operates the batter character 501 cannot see the screen of the game device 100 on the pitcher character side (screen of FIG. 14), it is not possible to recognize the selection of the pitch type and the location of a pitched ball made by the opponent user.

On the other hand, the user who operates the batter character 501 plays a game while seeing the screen illustrated in FIG. 6 and FIG. 8 to FIG. 13. When the batter character 501 comes to bat, the specific region 505 is superimposed on the strike zone 504, and initialized. Namely, the default position of the specific region 505 is a position at which the center of the specific region 505 coincides with the center of the strike zone 504.

The size of the aiming cursor 503 is set, for instance, such that the aiming cursor 503 within the specific region 505 has the largest size at the center of the specific region 505, and that the more the location of the aiming cursor 503 is away from the center, the smaller the size of the aiming cursor 503 becomes. Therefore, when the aiming cursor 503 is moved in the specific region 505 by the user as illustrated in FIG. 7, the size of the aiming cursor 503 is changed according to the local coordinate of the aiming cursor 503 in the specific region 505. Here, for the local coordinate, for instance, the coordinate system where the center of the specific region 505 (center point) is set as an original point may be applied.

As described above, the user is allowed to make a prediction on the location of a pitched ball before the pitcher character 502 releases a ball, and to move the specific region 505 as necessary. Even when the specific region 505 is moved, the setting of the size of the aiming cursor 503 within the specific region 505 is maintained basically.

For instance, when the user predicts (or expects) the location of a pitched ball to be a middle location of the strike zone 504, it is not necessary to move the specific region 505 from the default position where the center of the specific region 505 coincides with the center of the strike zone 504.

On the other hand, when the user predicts (or expects) the location of a pitched ball to be other location than the middle location of the strike zone 504, as shown in FIG. 10, FIG. 12, etc., the specific region 505 is moved so that the center of the specific region 505 exists at the location as predicted.

By the way, since the user who operates the pitcher character 502 cannot see the screen of the game device 100 on the batter character side (screens of FIG. 6, FIG. 8 to FIG. 13), it is not possible to recognize the location of a pitched ball predicted by the user on the batter character side.

After the ball is released by the pitcher character 502, a user is not allowed to move the specific region 505. A user who operates the batter character 501 can hit a pitched ball by moving the aiming cursor 503 to be superimposed onto the ball thrown by the pitcher character 502, and pressing a swing button at a ball hittable timing. Here, the ball hittable timing can be set to a prescribed hittable time period (for instance, a four frame time period) that the ball passes near the batter character 501.

By the way, if the aiming cursor 503 is not superimposed onto the ball thrown by the pitcher character 502, it is not possible to hit the ball. In this case, the bat swung by the batter character 501 misses the ball without hitting the ball.

As one variation, the aiming cursor 503 may be set to a prescribed region including a region in which bat can be effectively hit the ball, i.e., a sweet spot. In this case, it may be configured such that even when the aiming cursor 503 is not overlapped with the ball, as long as the bat hits the ball (i.e., the region around the aiming cursor 503, in which a bat object locates, is overlapped with the ball), the batter character 501 does perform a poor batting bit does not miss the ball.

When the swing button is pressed at other timing than the ball hittable timing, the batter character 501 misses a ball. On the other hand, when the swing button is pressed at the ball hittable timing, if the aiming cursor 503 is overlapped with the ball, the batter character 501 hits the ball. Even when the swing button is pressed at the ball hittable timing, if the aiming cursor 503 is not overlapped with the ball, the batter character 501 misses the ball (or may hit the ball, but the batting in this case is a poor batting).

If the prediction on the location of a pitched ball made by the user on the batter character side is correct, i.e., if the ball thrown by the pitcher character 502 comes near the center of the specific region 505 moved beforehand, it becomes easy to hit the pitched ball. This is because the aiming cursor 503 has the largest area at the center of the specific region 505.

On the other hand, if the prediction on the location of a pitched ball made by the user on the batter character side is not correct, i.e., if the ball thrown by the pitcher character 502 comes away from the center of the specific region 505 moved beforehand, it becomes difficult to hit a pitched ball. This is because the size of the aiming cursor 503 is set such that the more the aiming cursor 503 is away from the center of the specific region 505, the smaller the area of the aiming cursor 503 becomes.

When a hitting is made successfully, the game device 100 computes the track of the hit ball on the basis of the timing the swing button is pressed, an amount of displacement between the center (center of gravity) of the aiming cursor 503 and the center (center of gravity) of the ball and the like, and moves the ball. For instance, if the timing the swing button is pressed is around the middle of the hittable time period, a ball is hit toward the center field. If the timing the swing button is pressed is earlier than the middle of the hittable time period, a ball is pulled, and if the timing the swing button is pressed is later than the middle of the hittable time period, a ball would be hit to the opposite field. Furthermore, the smaller is the amount of displacement between the center of the aiming cursor 503 and the center of the ball, the stronger lined ball is the hit ball. Furthermore, if the center of the aiming cursor 503 is moved to the higher location from the center of the ball, the hit ball would be a ground ball. On the other hand, if the center of the aiming cursor 503 is moved to the lower location from the center of the ball, the hit ball would be a fly ball. As described, depending on how the aiming cursor 503 and the ball are overlapped, the speed and the angle of a hit ball change. Furthermore, the game device 100 may be configured to compute the track of a hit ball by taking also the ability parameters (power, trajectory or the like) of the batter character 501 into consideration. For the calculation of the track of the ball, the known algorithm may be applied.

[Functional Configuration and Operations of Game Device]

Figure 4:
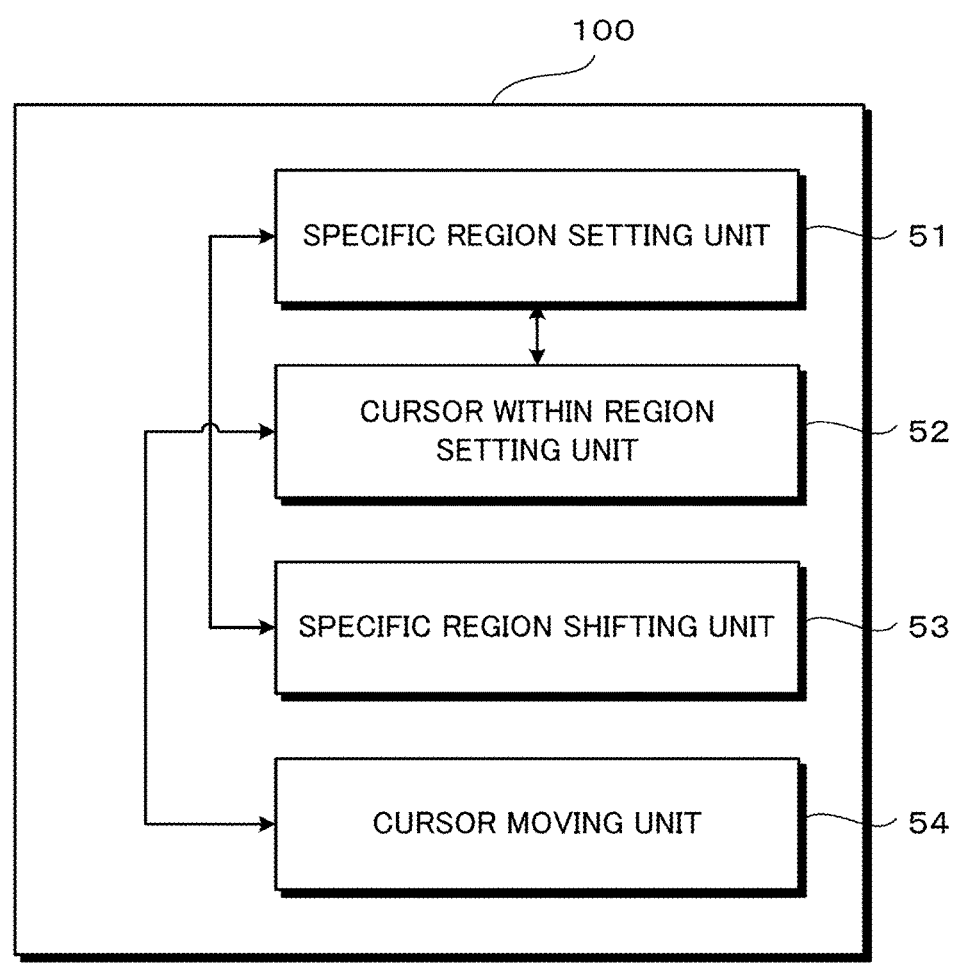
FIG. 4 is a functional block diagram illustrating a major configuration of the game device.

Next, the major functional configuration of the game device 100 is explained referring to the functional block diagram of the FIG. 4, etc. As shown in the FIG. 4, the game device 100 mainly comprises a specific region setting unit 51, a cursor within region setting unit 52 and the region, a specific region moving unit 53, and a cursor moving unit 54. These respective units are realized by the CPU 1 of the game device 100 executing the programs according to this embodiment.

The specific region setting unit 51 has the function of setting on the screen, a specific region 505 in which the aiming cursor 503 can be moved. The initial position on the screen of the specific region 505 can be set arbitrarily. In the baseball game of this embodiment, as illustrated in FIG. 6, the specific region setting unit 51 sets the initial position of the specific region 505 to the position of the strike zone 504 as an example of the reference position on the screen. Namely, the specific region 505 is initialized such that the coordinate of the center portion (center) of the specific region 505 coincides with the center portion (center) of the strike zone 504.

For instance, when the game program is loaded into the RAM 5 of the game device 100, also stored in the RAM 5 is the information on the global coordinate of the reference position on the screen, at which the specific region 505 is initialized. The specific region setting unit 51 initializes the specific region 505 on the screen on the basis of the information on the global coordinate of this reference position. Here, the global coordinate refers to, for instance, the coordinate based on the upper left corner of the game screen.

As described, the initial position (default position) before the specific region 505 is moved is always fixed to the reference position (for instance, the position of the strike zone 504). Therefore, it is possible for a user to recognize the position of the specific region 505 with ease, thereby improving the user's operability.

The timing at which the specific region 505 is initialized can be appropriately set arbitrarily according to the game contents. In this embodiment, the specific region setting unit 51 initializes the specific region 505 to the position of the strike zone 504 at the timing the batter character 501 comes to bat. Thereafter, in view of that a prediction of a prediction of location of a pitched ball is performed for each pitch, it may be configured to initialize (reset) the specific region 505 to the position of the strike zone 504 as the reference position each that the pitcher character 502 starts warming up for pitching. For instance, considered is the case where the user moved the specific region 505 to the outside from the reference position before pitching, and then the batter character 501 took a pitch, hit a foul ball or missed the ball. In this case, when the pitcher character 502 starts the warming up for the next pitch, the specific region 505 moved to the outside is automatically moved back to the reference position.

It may be configured that after the specific region setting unit 51 initializes the specific region 505 to the position of the strike zone 504 as the reference position at the timing the batter character 501 comes to bat, the position of the specific region 505 is maintained without automatically moving it back to the initial position.

Moreover, the size and the shape of the specific region 505 on the screen can be set arbitrarily. In the example of this embodiment, the specific region 505 is set to have the same size and the shape (rectangular shape) as the strike zone 504. As a result, as illustrated in FIG. 6, the specific region 505 is set to coincide with the strike zone 504 at the reference position.

According to the configuration wherein the specific region 505 coincides with the strike zone 504 at the reference position, it is not necessary to move the specific region 505 when the user predicts a location of a pitched ball to be a center location, and the specific region 505 should be moved only when the user predicts the location of the pitched ball to be other than the center location. As described, by realizing the prediction on the location of a pitched ball based on the reference position of the strike zone 504, it is possible to significantly improve the user's operability.

Next, the cursor within region setting unit 52 is explained. This cursor within region setting unit 52 has the function of setting the size of the aiming cursor 503 within the specific region 505 so as to change the size of the aiming cursor 503 thereof according to its position in the specific region 505. Namely, the relationship between the location of the aiming cursor 503 within the specific region 505 and the size of the aiming cursor 503 is predetermined.

For the position information within the specific region 505, for instance, local coordinate with the original point of the center portion (center) of the specific region 505 or the like can be applied.

For the position information within the specific region 505, global coordinates on the entire game screen (for example, the coordinates based on the upper left corner) are also applicable. In this case, applied is the global coordinate at the reference position on the screen, to which the specific region 505 is initialized (this reference position is the position of the strike zone 504 in this embodiment).

For instance, the information of the table showing the relationship between the locations within the specific region 505 and the sizes of the aiming cursor 503 is stored in the recording medium 300 having stored therein the game program. When the game is executed, information on the above table is loaded into the RAM 5. In this case, the cursor within region setting unit 52 sets the size of the aiming cursor 503 within the specific region 505 on the basis of the above table.

The size of the aiming cursor 503 is changed in the specific region 505 such that the aiming cursor 503 basically has a similar shape at any position. Therefore, for example, as illustrated in FIG. 7, in the case where the aiming cursor 503 has a circular shape, for the information on the size of the aiming cursor 503, the information on the radius or the diameter of the circle may be adopted.

Figure 15:
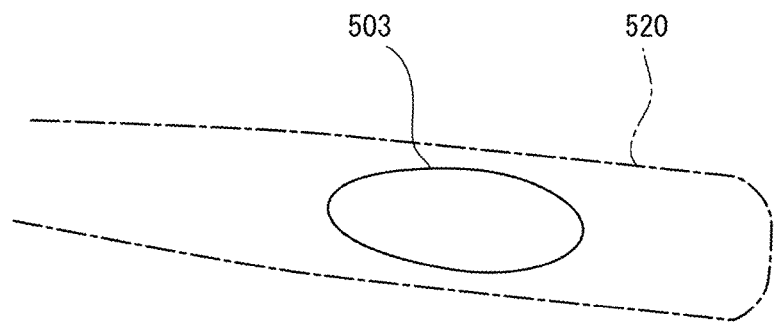
FIG. 15 is an explanatory diagram illustrating an example of the shape of an aiming cursor.

The shape of the aiming cursor 503 is not limited to the circular shape, and an arbitrary shape may be adopted. In view of that a ball is hit with a bat object 520 in a baseball game, as illustrated in FIG. 15, the aiming cursor 503 may have an elliptical shape in accordance with the shape of the bat object 520. In this case also, the aiming cursor 503 is configured to have a similar shape irrespectively of the size of the aiming cursor 503, the size being subject to change according to the location in the specific region 505. Therefore, in this case, for the information indicative of the size of the aiming cursor 503, for instance, the major axis or the minor axis of an ellipse may be adopted.

Here, as shown in FIG. 7, it is preferable that the cursor within region setting unit 52 sets the size of the aiming cursor 503 within the specific region 505 such that the more the aiming cursor 503 is positioned away from the center portion of the specific region 505, the smaller the size of the aiming cursor 503 becomes. In this case also, the cursor within region setting unit 52 can set the size of the aiming cursor 503 within the specific region 505 on the basis of the above table. Furthermore, the size of the aiming cursor 503 within the specific region 505 may be set using a function. That is, the size of the aiming cursor 503 is mathematized into a function of the distance from the center portion of the specific region 505, and the size of the aiming cursor 503 within the specific region 505 is set based on the function.

According to the configuration wherein the size of the aiming cursor 503 is set such that the more the aiming cursor 503 is positioned away from the center portion of the specific region 505, the smaller the size of the aiming cursor 503 becomes, and the aiming cursor 503 has the maximum size at the center portion of the specific region 505, where it is the easiest to perform a hitting operation. Therefore, by moving the specific region 505 on the basis of the center portion (reference position) of the specific region 505 so that the center portion is positioned at the predicted location, a user can reflect the prediction on the location of a pitched ball to games, thereby realizing an improved user's operability.

Moreover, in this case, the difficulty level of a hitting operation changes in proportion to the distance between the location of the ball in the specific region 505 and the center portion of the specific region 505. This distance indicates the level of accuracy of the prediction, such that the shorter the distance is, the more accurate the prediction is, and the easier the batting operation becomes. On the other hand, the shorter the distance is, the smaller the size of the aiming cursor 503 is, and the more difficult the batting operation becomes. As described, the accuracy level of the prediction is reflected to the difficulty level of a batting operation.

Furthermore, it is preferable that the cursor within region setting unit 52 adjusts the setting of the size of the aiming cursor 503 within the specific region 505 on the basis of the parameters of the batter character 501 as an example of the first character.

Here, examples of the parameters of the batter character 501 include parameters related to the strong location or weak location for batting. In a baseball game, each of the first to the ninth player characters go to bat in the order as batter characters 501, and for each player character, parameters concerning the strong location and the weak location for batting are set. For instance, an inside location is a strong location, but an outside location is a weak location, or a high location is a strong location, but a low location is a weak location. Each player character has its own parameters related to the strong location and the weak location.

Figure 16:
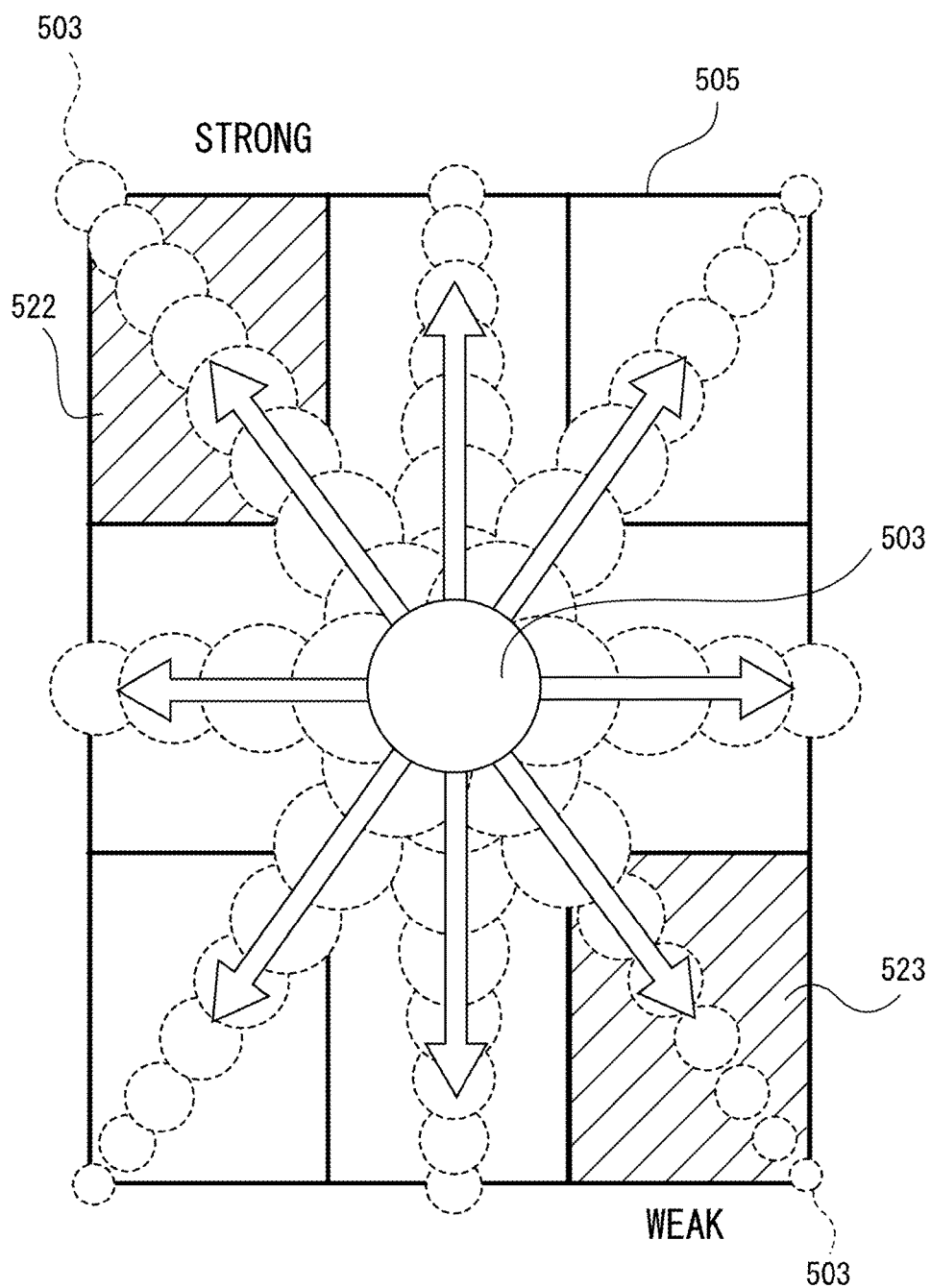
FIG. 16 is an explanatory diagram illustrating another example of the setting of the size distribution of the aiming cursor within the specific region.

FIG. 16 shows an example of setting the specific region 505 in the case the player character A, who is right-handed and to whom the parameter on weak location of low-and-outside is set, is at bat as the batter character 501. In this case, as shown in FIG. 16, the cursor within region setting unit 52 adjusts the setting of the size distribution of the aiming cursor 503 within the specific region 505 such that the size of the cursor in a high-and-inside portion 522 (hatched region in FIG. 16) is larger than the default size, while the size of the cursor in an low-and-outside portion 523 (hatched region in FIG. 16) is smaller than the default size. In FIG. 16, the settings for other regions than the high-and-inside portion 522 and the low-and-outside portion 523 are performed in the same manner as the case shown in FIG. 7.

As described, the size of aiming cursor 503 within the specific region 505 is set larger than the default size for the strong location of a pitched ball, the size of aiming cursor 503 within the specific region 505 is set smaller than the default size for the weak location of a pitched ball.

Moreover, a meet ability may be adopted as an example of the parameters of the batter character 501, and the cursor within region setting unit 52 may be configured to adjust the size of the aiming cursor 503 according to the meat ability. The meet ability refers to the ability of hitting a ball with a bat, and the cursor within region setting unit 52 adjusts the size of the aiming cursor 503 such that the higher the meet ability of the batter character 501 is, the larger the aiming cursor 503 is. In this case, the described adjustment of the size of the aiming cursor 503 is performed with respect to the entire region of the specific region 505.

According to the foregoing configuration, it is possible to accurately reflect parameters of the batter character 501 to the difficulty level of the batting operation, thereby realizing improved amusement properties of the game.

Next, the specific region moving unit 53 is explained.

This specific region moving unit 53 has the function of moving the specific region 505 according to the user's operation before the movement of a ball (an example of a movable object) is started. In this embodiment, the specific region moving unit 53 moves the specific region 505 on the screen according to the user's operation with the controller 19 or the like before the ball is released from the pitcher character 502.

For the methods of moving the specific region 505, there are two methods, i.e., the method in which the specific region 505 itself is moved directly according to the user's operation, and the method in which the user performs an operation of moving the aiming cursor 503, and the specific region 505 is moved indirectly and automatically according to the location of the aiming cursor 503. First, the former method is explained.

The specific region moving unit 53 has the function of moving the specific region 505 according to the user's operation of directly moving the specific region 505 before the movement of a ball thrown by the pitcher character 502 is started. For instance, by performing an operation of pressing direction keys in the vertical and the horizontal directions of the controller 19, the user can directly move the specific region 505 in the direction according to the user's operation.

Irrespectively of the movement of the specific region 505, the setting in the specific region 505 (setting of changing the size of the aiming cursor 503 according to the location of the aiming cursor 503 within the region) is basically maintained. Namely, irrespectively of the changes in the global coordinate of the specific region on the screen, the relative relationship between the local coordinate in the specific region 505 and the size of the aiming cursor 503 does not change.

When the position (global coordinate) of the specific region 505 on the screen is changed by moving the specific region 505, the local coordinate in the specific region 505 can be easily converted into the global coordinate of the moved position by applying the known geometric transformation algorithm.

The unit of the movement of the specific region 505 can be set arbitrarily. For instance, as shown in FIG. 10 or FIG. 12, the strike zone 504 is divided both horizontally and vertically into three equal parts respectively to form a grid of nine divided square regions, so that the specific region 505 can be moved horizontally (to the inside or outside location) by a unit of square. In this case, the distance of ⅓ of the length of the strike zone 504 in the horizontal direction is the minimum unit of the movement. With this configuration, for instance, as shown in FIG. 9, by the user's operation of pressing the right direction key once in the state where the specific region 505 coincides with the strike zone 504, the specific region 505 is moved to the right by one square unit to the state the user predicts the location of a pitched ball to be an outside location as shown in FIG. 10. As described, according to the configuration wherein the distance of ⅓ of the length of the strike zone 504 in the horizontal direction is set to the minimum unit of movement, it is possible to make the center portion of the specific region 505 coincide with the center of the outside location or the inside location of the strike zone precisely, thereby realizing an improved operability.

Similarly, it may be configured that the specific region 505 can be moved by a unit of one square of nine divided equal square in the vertical direction (to the high location or to the low location). In this case, the distance of ⅓ of the length of the strike zone 504 in the vertical direction is the minimum unit of movement. According to this configuration, it is possible to make the center portion of the specific region 505 coincide with the center of the high location or the low location of the strike zone precisely, thereby realizing an improved operability.

Certainly, it may be configured that the specific region 505 can be moved by a unit of one square of nine divided equal squares both in the horizontal direction and the vertical direction. In this case, the user is allowed to make a prediction on the location of a pitched ball within the specific region 505 moved in a direction as desired by moving the specific region 505 not only to the inside location, the outside location, the high location and the low location, but also to the high-and-inside location, the low-and-inside location, the high-and-outside location and the low-and-outside location.

Figure 17:
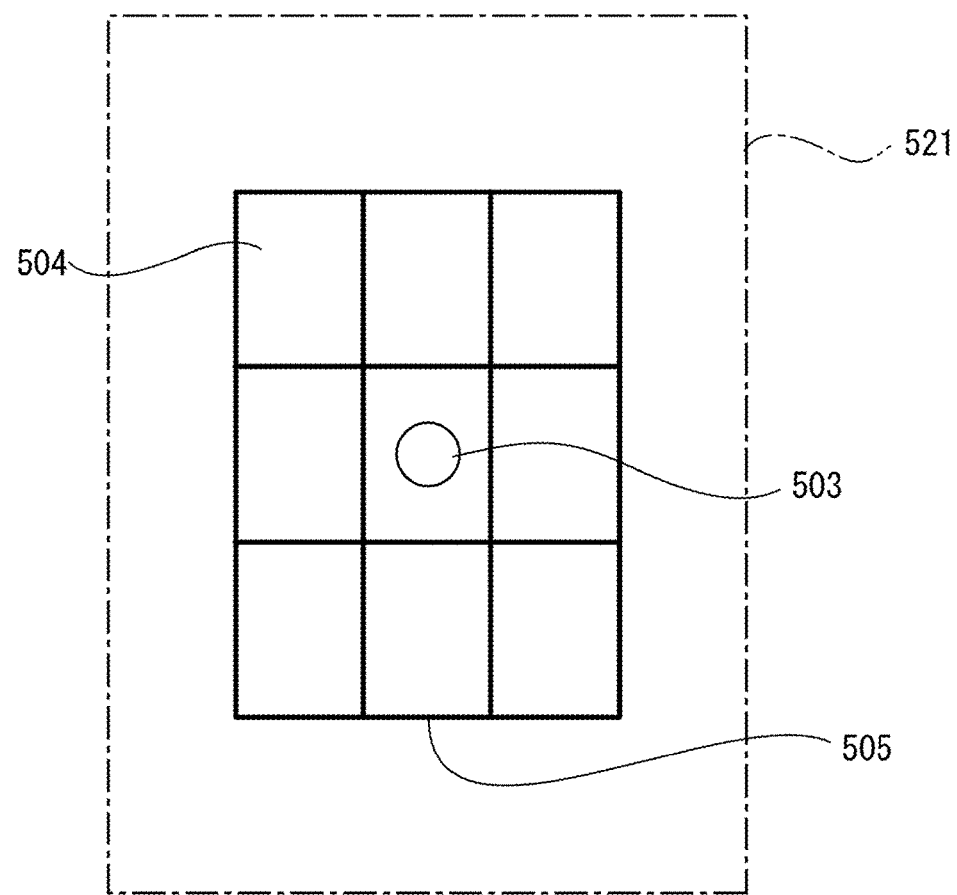
FIG. 17 is an explanatory diagram explaining the movable range with respect to the specific region.

As shown in FIG. 17, it is preferable to set a prescribed movable range 521 with respect to the specific region 505. For instance, the movable range is set such that the specific region 505 cannot be moved more than one square in the up, down, left and right directions from the state the specific region 505 coincides with the strike zone 504. The movement of the specific region 505 is limited within the prescribed movable range 521 for the following reason. That is, the aiming cursor 503 can be moved at least within the specific region 505. Where the batter character 501 is required to perform a batting operation in a batter's box, if the specific region 505 is set movable anywhere without limitation, the range in which the batter character 501 can perform a batting operation would be extended to be too large unnaturally. In order to prevent such problem, the movable range 521 is set with respect to the specific region 505 so as to limit the movement of the specific region 505 to an appropriate range.

The unit of the movement of the specific region 505 is not limited to the above example. It may be also configured that the strike zone 504 is divided both horizontally and vertically into n equal parts (n is a natural number of 2 or larger) respectively to form a grid of a plurality of divided square regions, so that the specific region 505 can be moved to horizontally and/or vertically by a unit of square. Moreover, the movable range 521 of the specific region 505 can be set arbitrarily.

It may be also configured that the specific region 505 can be moved to an arbitrary position by a unit of a dot within the movable range of the specific region 505.

According to the configuration of this embodiment, the user is allowed to performing an input operation for the prediction on the location of a pitched ball beforehand by performing the operation of directly moving the specific region 505 before the movement of the ball thrown by the pitcher character 502 is started. With this configuration, it is possible to clarify the position of the specific region 505 on the screen as the location of the pitched ball predicted by the user.

By the way, it may be configured that the specific region 505 is visible until the ball is released from the pitcher character 502, but becomes invisible on the screen after the ball is released by making the specific region 505 transparent on the screen. Alternatively, it may be configured that the visibility of the specific region 505 is lowered after the ball is released than the visibility before the ball is released by increasing the transparency of the specific region 505. Here, even in the state the specific region 505 becomes invisible on the screen, the specific region 505 itself exists. Therefore, the setting of the size of the aiming cursor 503 within the specific region 505 can be maintained.

For the visualization of the strike zone 504, various modifications can be adopted. For example, the strike zone 504 may be visualized all the time, or invisualized only after the pitcher character starts a pitching motion, or only after a ball is released from the pitcher character 502, and the like.

Next, the cursor moving unit 54 is explained. This cursor moving unit 54 has the function of moving the aiming cursor 503 according to the user's operation. For instance, when a user operates the controller 19 with an analog stick, a direction key or the like, the cursor moving unit 54 moves the aiming cursor 503 on the screen according to the user's operation. The user's operation of moving the aiming cursor 503 may be performed of course after the ball is released by the pitcher character 502, and even before the ball is released.

As described, the aiming cursor 503 can be moved at least within the specific region 505. The aiming cursor 503 may be configured to be movable also in the outside of the specific region 505 or immovable in the outside of the specific region 505.

Figure 18:
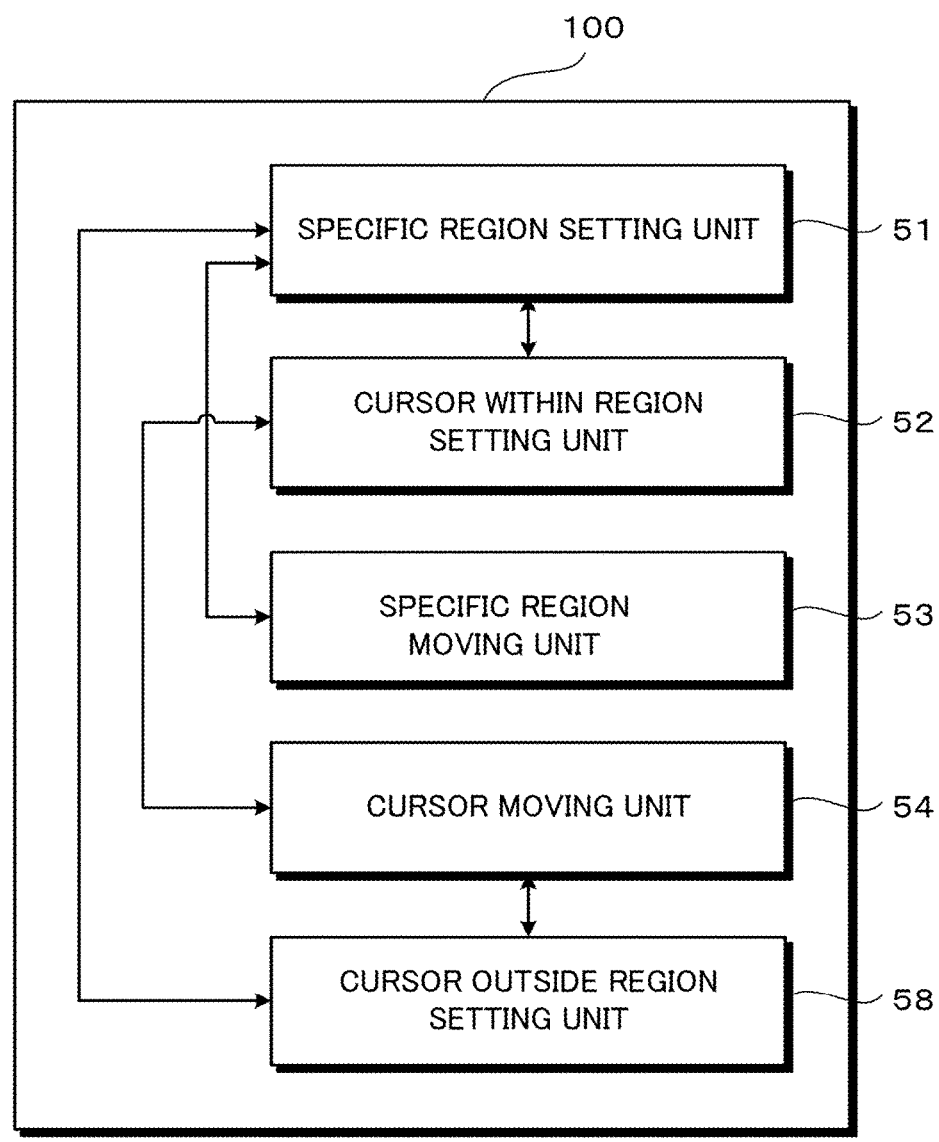
FIG. 18 is a functional block diagram illustrating another example of the major configuration of the game device.

By the way, also in the real world, it is more difficult to hit a pitched ball in the outside of the strike zone than a pitched ball in the strike zone. However, it is still possible to skillfully hit a bad ball in the outside of the strike zone. To reflect this on the game realistically, as shown in the functional block diagram of FIG. 18, the game device 100 may be configured to further comprise a cursor outside region setting unit 58.

The cursor outside region setting unit 58 has the function of setting the size of the aiming cursor 503 in the outside of the specific region 505 to be smaller than the size of the aiming cursor 503 at the boundary of the specific region 505 between the inside and outside of the specific region 505.

According to the foregoing configuration wherein the aiming cursor 503 is set to be movable also in the outside of the specific region 505; on the other hand, the size of the aiming cursor 503 is set smaller than that within the specific region 505 so that the batting operation of a pitched ball in the outside of the specific region 505 becomes more difficult, thereby realizing an improved game in a term of reality.

In the case where the aiming cursor 503 is movable also in the outside of the specific region 505, it is preferable to limit the movable range of the aiming cursor so that the batting operable range is not extended too large unnaturally. For instance, the movable range 521 of the specific region 505 illustrated in FIG. 17 can be set for the movable range of the aiming cursor 503.

As described, the game device 100 according to this embodiment controls a baseball game in which a user who operates the batter character 501 superimposes the aiming cursor 503 on a ball thrown by the pitcher character 502. For the preferable configuration, this game device 100 comprises the cursor moving unit 54 for moving the aiming cursor 503 according to a user's operation; the specific region setting unit 51 for setting in the strike zone 504, the specific region 505 in which the aiming cursor 503 is movable; the cursor within region setting unit 52 for setting the size of the aiming cursor 503 within the specific region 505 so that the more the specific region 505 is away from a center portion of the specific region 505, the smaller the size of the aiming cursor 503 is; and the specific region moving unit 53 for moving the specific region 505 from the strike zone 504 according to a user's operation before the pitcher character 502 throws the ball.

Figure 19:
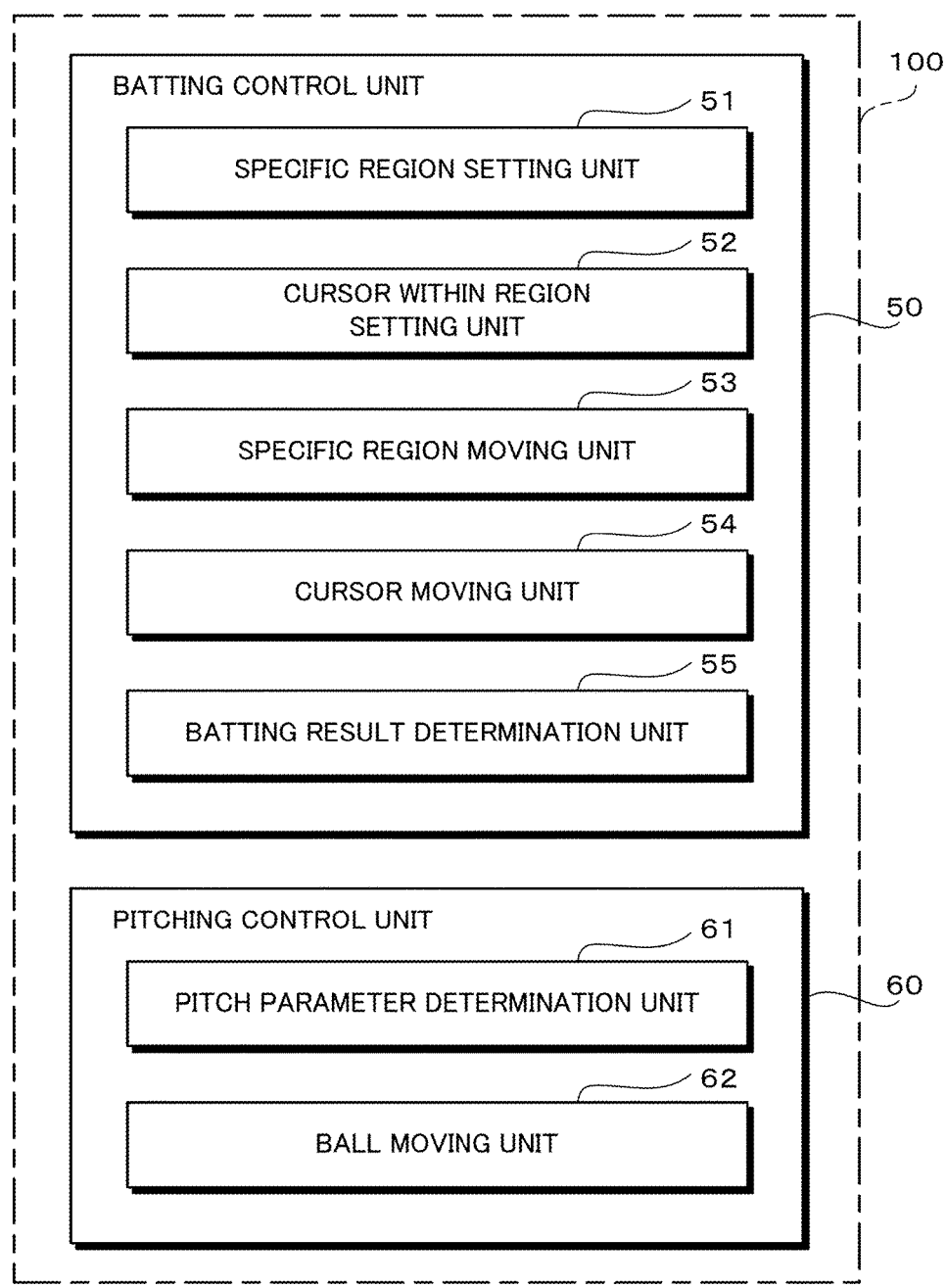
FIG. 19 is a functional block diagram illustrating an example of the basic configuration of the game device.

By the way, in the baseball game, since the game progresses while switching the offense side and the defense side inning by inning, a user can perform a game operation both on the batter character side and the pitcher character side. In response, as shown in the functional block diagram of FIG. 19, the game device 100 basically comprises a batting control unit 50 for controlling a batting operation by the batter character 501 and a pitching control unit 60 for controlling a pitching by the pitcher character 502. The above-mentioned specific region setting unit 51, the cursor within region setting unit 52, the specific region moving unit 53 and the cursor moving unit 54 can be included as the functions of the batting control unit 50. The batting control unit 50 further comprises a batting result determination unit 55.

The batting result determination unit 55 has the function of determining a result of batting on the basis of the timing of pressing the swing button, the amount of displacement between the center of the aiming cursor 503 and the center of a ball, the ability parameter or the like of the batter character 501.

The pitching control unit 60 comprises a pitch parameter determination unit 61 and a ball moving unit 62. The pitch parameter determination unit 61 has the function of determining pitching parameters on the basis of the operation of the user who operates the pitcher character 502. As described, the user on the pitcher character side is allowed to select the location of a pitched ball, a pitch type and the like by operating the controller 19 or the like. The pitch parameter determination unit 61 determines pitching parameters (an example of movement parameters) related to the movement of a ball such as the location of a pitched ball, a pitch type and the like (change in the track and the speed of the ball) and the like, on the basis of the user's operation of selecting the location of a pitched ball, the pitch type and the like.

The ball moving unit 62 has the functions of calculating the track of a ball released by the pitcher character 502 on the basis of pitching parameter determined by the pitch parameter determination unit 61, and moving the ball towards the home base.

When a communication match is performed between two users respectively operating their game devices 100, a pitching parameter determined by the pitch parameter determination unit 61 of the game device 100 of the user on the pitcher character side is transmitted to the game device 100 of the user on the batter character side. Then, the ball moving unit 62 of the game device 100 of the user on the batter character side moves the ball released by the pitcher character 502 on the basis of the pitching parameter received from the game device 100 of the user on the pitcher character side.

When the user plays a game alone in the CPU match mode, and the user operates on the side of the batter character 501, the CPU 1 of the game device 100 controls a pitching operation by the pitcher character 502 by the automatic control based on an AI program (Artificial Intelligence Program) or the like. Namely, in this case, the pitch parameter determination unit 61 determines the pitching parameters automatically.

In this CPU match mode, the pitch parameter determination unit 61 determines the pitching parameter at the time the initial setting of the specific region 505 is made (i.e., before the user moves the specific region 505).

An operation example of the game device according to an embodiment of the present invention is now explained with reference to the flowcharts of FIG. 20 and FIG. 21. FIG. 20 and FIG. 21 show processing examples in the case where the batter character 501 operated by a user performs a batting operation.

When the batter character 501 comes to bat (S1), the game device 100 sets the specific region 505 on the screen (S2). In this embodiment, as shown in FIG. 6, the game device 100 initializes the specific region 505 at the strike zone 504 as the reference position on the screen. This specific region 505 is visualized on the screen.

Then, the game device 100 sets the relative relationship between the location of the aiming cursor 503 within the specific region 505 and the size of the aiming cursor 503 (S3). Namely, the game device 100 sets the size of the aiming cursor 503 within the specific region 505 so as to change the size of the aiming cursor 503 according to the location of the aiming cursor 503 in the specific region 505. In this embodiment, as illustrated in FIG. 7, the game device 100 sets the size of the aiming cursor 503 within the specific region 505 such that the more the location of the aiming cursor 503 is away from the center of the specific region 505, the smaller the size of the aiming cursor 503 within the specific region 505 becomes. Furthermore, as illustrated in FIG. 16, the setting of the size of the aiming cursor 503 within the specific region 505 may be adjusted on the basis of parameters related to strong or weak points of the batter character 501.

The cursor within region setting unit 52 of the game device 100 stores in a storage device (for instance, RAM 5) the set information on the size of the aiming cursor 503 within the specific region 505. Here, the set information stored in the storage device can be the information of the table showing the relationship between the locations with the specific region 505 and the sizes of the aiming cursor 503. For instance, the game device 100 stores in the RAM 5 the information of the table showing the relationship between the local coordinate (or global coordinate) in the specific region 505 and the sizes of the aiming cursor 503 in the RAM 5.

Moreover, when the specific region 505 is set on the screen, the game device 100 preferably initializes the aiming cursor 503 at the center portion of the specific region 505, i.e., the center portion of the strike zone 504.

Then, a user is allowed to perform operations of making a prediction on the location of a pitched ball before the ball is released from the pitcher character 502 and moving the specific region 505 as necessary. For instance, when the user predicts the location of a pitched ball to be an outside location, as illustrated in FIG. 10, the user can move the specific region 505 such that that the center portion of the specific region 505 locates in the outside portion of the strike zone 504. As a result, the size of the aiming cursor 503 is maximized in the outside, which makes it easier for the user to hit an outside pitch, and the user can perform a batting operation while expecting the outside pitch. On the contrary, when the specific region 505 is moved to the position where the center portion thereof is moved to the outside, as illustrated in FIG. 11, the size of the aiming cursor 503 becomes smaller at the center portion than that shown in FIG. 6, and the user finds it more difficult to perform a batting operation of hitting a middle pitch.

For instance, when the user predicts the location of a pitched ball to be an inside location, as illustrated in FIG. 12, the user can move the specific region 505 so that the center portion of the specific region 505 locates in the inside portion of the strike zone 504. As a result, the size of the aiming cursor 503 is maximized in the inside portion, which makes it easier for the user to hit an inside pitch, and the user can perform a batting operation while expecting the inside pitch.

For instance, when the user predicts the location of a pitched ball to be a center portion of the strike zone 504, as illustrated in FIG. 6, since the center portion of the specific region 505 coincides with the center portion of the strike zone 504 in the default state, it is not necessary to move the specific region 505. In this case, the size of the aiming cursor 503 is maximized at the center portion, which makes it easier for the user to hit a middle pitch, and the user can perform a batting operation while expecting a middle pitch.

When an operation of moving the specific region 505 is performed by the user (S4; YES), the game device 100 moves the specific region 505 on the screen while maintaining the setting in the specific region 505 (setting of changing the size of the aiming cursor 503 according to the location of the aiming cursor 503 within the specific region 505) (S5).

As described, in the case where the specific region 505 on the screen is moved, the following variations can be considered for the location of the aiming cursor 503 after the specific region 505 is moved.

In the case where the specific region 505 is moved, the aiming cursor 503 may be set again automatically at the center portion of the specific region 505 after being moved.

When the specific region 505 is moved, the aiming cursor 503 is moved automatically along with the movement of the specific region 505, while maintaining the relative position of the specific region 505 with the aiming cursor 503 within the specific region 505. Namely, before and after the specific region 505 is moved, the local coordinate of the aiming cursor 503 within the specific region 505 does not change.

Alternatively, it may be configured that the absolute position (global coordinate) on the screen of the aiming cursor 503 does not change irrespectively of the movement of the specific region 505.

After executing step S5, or when an operation of moving the specific region 505 is not performed in step S4, the sequence moves to S6.

In step S6, when an operation of moving the aiming cursor 503 is performed by the user (S6; YES), the game device 100 moves the aiming cursor 503 on the screen (S7). Since the location of the aiming cursor 503 is changed within the specific region 505 by moving the aiming cursor 503, the game device 100 changes the size of the aiming cursor 503 along with the movement of the aiming cursor 503 (S8). For instance, the game device 100 changes the size of the aiming cursor 503 along with the movement of the aiming cursor 503 within the specific region 505 on the basis of the information of the table showing the relationship between the local coordinates in the specific region 505 and sizes of the aiming cursor 503, which is stored in the RAM 5.

After executing step S8, or when an operation of moving the aiming cursor 503 is not performed in step S6 (S6; NO), the sequence moves to S9. In S9, if a ball has not been released from the pitcher character 502 (S9; NO), the sequence moves back to step S4, and steps S4 to S9 are repeated.

On the other hand, in this S9, if a ball has been released from the pitcher character 502 (S9; YES), the sequence goes to step S10 of FIG. 21, and the game device 100 executes a display control of moving a pitched ball on the screen.

Here, after the ball is released from the pitcher character 502, it is preferable to make the specific region 505 invisible for the following reason. That is, if the specific region 505 is still visible after the ball released from the pitcher character 502, the visibility of the pitched ball or the aiming cursor 503 would become poor. In response, in order to avoid such problem and realize an improved operability of a user, the specific region 505 is made invisible after the ball is released.

For the similar reason, it is preferable that the frame display of the strike zone 504 is also made invisible after a ball is released from the pitcher character 502. Here, the frame display of the strike zone 504 is made invisible after the pitcher character 502 starts a pitching motion such as raising the foot, etc.

In the above, shown is the example in which a user is allowed to perform the operation of moving the specific region 505 until a ball is released from the pitcher character 502, i.e., until the movement of the ball as an example of the movable object is started. However, it may be also configured as follows. That it, a user is allowed to perform the operation of moving the specific region 505 until the pitcher character 502 starts a pitching motion, and after the pitcher character 502 starts the pitching motion, the operation of moving the specific region 505 is prohibited. Namely, it may be configured that a user is allowed to perform the operation of moving the specific region 505 until a prescribed timing before the movement of the movable object (ball, etc.) is started, and after the prescribed timing, the operation of moving the specific region 505 is prohibited.

In the configuration wherein the operation of moving the specific region 505 is prohibited after the pitcher character 502 starts the pitching motion, it is preferable that the specific region 505 is made invisible at the timing the pitching motion is started. By making the specific region 505 invisible at the timing the operation of moving the specific region 505 is prohibited, it is possible to make a user clearly recognize that the specific region 505 cannot be moved.

After the ball is released from the pitcher character 502, the user performs an operation of moving the aiming cursor 503 so that the aiming cursor 503 superimposes on the ball being moved. When the operation of moving the aiming cursor 503 is performed by the user (S11; YES), the game device 100 moves the aiming cursor 503 on the screen (S12). The location of the aiming cursor 503 within the specific region 505 is changed by this movement of the aiming cursor 503, whereby the game device 100 changes the size of the aiming cursor 503 along with the movement of the aiming cursor 503 (S13).

For instance, assumed that as shown in FIG. 10, a user predicts the location of a pitched ball to be an outside location, and the user performs an input operation of moving the specific region 505 to the outside location beforehand. If the user's prediction is correct, and an outside pitch actually comes, the size of the aiming cursor 503 is maximized in the outside portion, which makes it easier for the user to hit an outside pitch. On the other hand, if the user's prediction is wrong, for instance, a middle pitch comes, and the aiming cursor 503 is moved to the center portion, the size of the aiming cursor 503 becomes smaller, which makes it difficult for t user to hit a middle pitch. As described, when a user makes a prediction on the location of a pitched ball, and performs an input for the prediction beforehand (operation of moving the specific region 505), if the prediction is correct, it becomes easy to hit a ball; on the other hand, if the prediction is wrong, the user has a disadvantage that hitting a middle pitch, which is originally easy, becomes difficult.

After executing step S13, or when an operation of moving the aiming cursor 503 has not performed in step S11 (S11; NO), the sequence moves to S14. In S14, if the user has not performed a batting operation, i.e., an operation of pressing the swing button (S14; NO), it is determined if the ball has reached the position of a catcher behind the home base (S15). In S15, if the ball has not reached the position of the catcher (S15; NO), the sequence moves back to step S10, and steps S10 to S15 are repeated.

On the other hand, when the user has performed the batting operation by pressing the swing button (S14; YES), the game device 100 makes the batter character 501 perform a batting operation of swinging a bat (S16). Thereafter, the game device 100 determines the result of batting on the basis of the timing of pressing the swing button, the degree of overlapping between the aiming cursor 503 and a pitched all, the ability parameter of the batter character 501, and the like (S17), and displays the result of batting (S18). For instance, when the hitting is made successfully, the game device 100 computes the track of the hit ball on the basis of the timing the swing button is pressed, an amount of displacement between the center of the aiming cursor 503 and the center of the ball and the like, and moves the ball (the hit ball).

On the other hand, when the user did not perform a batting operation (S14; NO) before the pitch reached the position of the catcher (S15; YES), i.e., when the batter character 501 took a pitch, the result is displayed on the screen (S18). On the screen of FIG. 10, etc., the display of a ball count, an out count, etc., is omitted. However, for instance, when the ball passes the strike zone 504, the display of the "strike" count is updated, and when the ball is displaced from the strike zone 504, the display of the "ball" count is updated.

After step S18, the game device 100 determines if a pitching operation for the batter character 501 currently at bat continues (S19). For example, when the batter character 501 hit the foul ball, missed the ball (not yet a strike out), let the pitch go by (not yet a strike out or a base on balls), the pitching operation for the same batter character 501 continues (S19; YES), and the sequence goes back to S2. Namely, in step S2, when the pitcher character 502 starts the next pitching motion, the game device 100 resets the specific region 505 to the position (reference position) of the strike zone 504.

On the other hand, when the result of batting (hit or out) of the batter character 501 is confirmed, and the pitching does not continue for that batter character 501 (S19; NO), the processing is ended. Then, in the case where a new batter character 501 comes to bat, the processing in FIG. 20 and FIG. 21 is executed again.

As described, according to the configuration wherein the size of the aiming cursor 503 within the specific region 505 is set such that the size of the aiming cursor 503 is changed according to the location of the aiming cursor 503 within the specific region 505, it is possible to set the operation difficulty according to the location of a ball pitched by the pitcher character 502, and to allow the user to make a prediction on the location of a pitched ball by moving the specific region 505 while maintaining the relative relationship between the location of the aiming cursor 503 within the specific region 505 and the size of the aiming cursor 503.

The user operating the pitcher character 502 (or the CPU 1 in the CPU match) can throw a ball towards the end portion of the strike zone, in which it is originally difficult for the batter character 501 to hit a ball pitched. In response, by making a prediction on the location of a pitched ball and moving the specific region 505 to the predicted location of the pitched ball, the user operating the batter character 501 makes it easier to hit the pitched ball at the end portion of the strike zone 504, which is originally disadvantageous for the batter character 501. On the other hand, when the prediction on the location of a pitched ball was wrong, the batting operation becomes more difficult than usual to be disadvantageous for the user operating the batter character 501. As a result, it is possible to realize a game with high amusement properties by reflecting the user's prediction on the location of a pitched ball realistically.

According to the configuration of the present embodiment, it is possible to reflect the tactics between pitcher and batter in the real world to games precisely and realistically such that the user (or the CPU 1) on the pitcher character side forms a strategy on a combination of pitches while thinking of pitches that can be avoided from being hit; on the other hand, the user on the batter character side tries to knock out the pitcher character 502 by reading pitches.

Next, the variations of the cursor within region setting unit 52 are explained. When the user predicts the location of a pitched ball to be other than the middle location, i.e., the center portion of the strike zone 504 (for instance, an outside location), and performs a batting operation while expecting the outside pitch, if the prediction is correct, the batting operation becomes easier than the case where the prediction on the location of a pitched ball did not make. However, this prediction on the location of a pitched ball is made on the basis of the user's consciousness to the end. Therefore, in practice, as compared to the case of hitting a middle pitch while expecting the middle pitch, it is slightly more difficult to hit a pitch of the expected location other than the middle pitch. In order to reflect the foregoing to games realistically, the cursor within region setting unit 52 may be configured as follows.

That is, the cursor within region setting unit 52 sets the size of the aiming cursor 503 at a center portion of the specific region 505 in the case where the specific region 505 is moved from the reference position (the position of the strike zone 504 in this embodiment) to be smaller than the size of the aiming cursor 503 at a center portion of the specific region 505 in the case where the specific region 505 exists at the reference position.

Figure 22A:
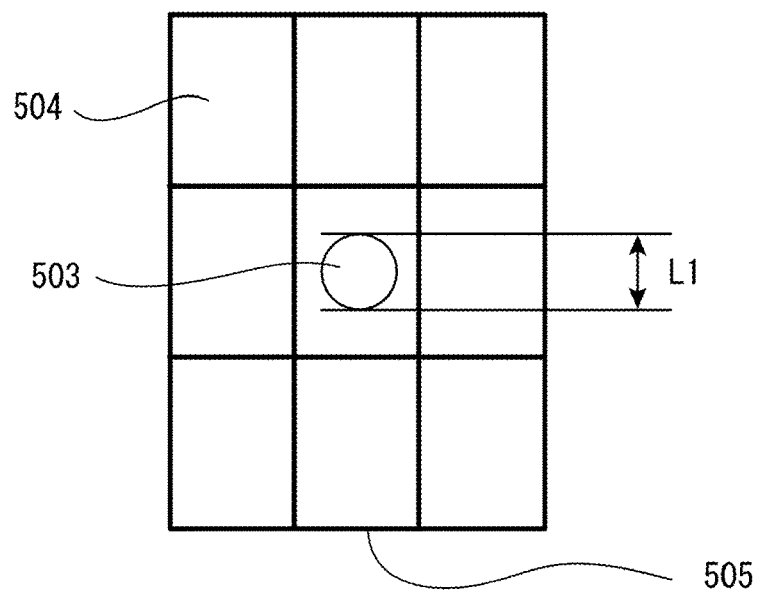
FIG. 22A is an explanatory diagram explaining the size of an aiming cursor at a center portion of a specific region when the specific region exists at the reference position.
Figure 22B:
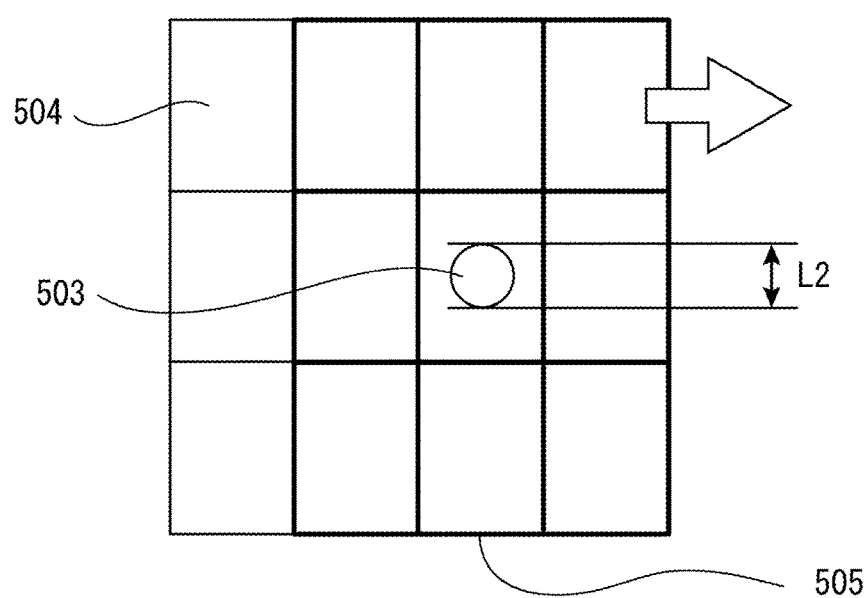
FIG. 22B is an explanatory diagram explaining the size of an aiming cursor at a center portion of a specific region when the specific region moves away from the reference position.

For instance, as shown in FIG. 22A, in the case where the specific region 505 exists at the position of the strike zone 504 that is the reference position, the diameter of the aiming cursor at a center portion of the specific region 505 is denoted by L1. Furthermore, as illustrated in FIG. 22B, in the case where the specific region 505 is moved from the strike zone 504 that is the reference position to the outside location of a right-handed batter, the diameter of the aiming cursor at a center portion of the specific region 505 is denoted by L2. In this case, the condition of L1>L2 holds. This condition holds also in the case of moving the specific region 505 from the position of the strike zone 504 to the inside location, the high location or the low location.

As described, the size of the aiming cursor 503 at the center portion of the specific region 505 when the specific region 505 is moved from the strike zone that is the reference position is set smaller than the size of the aiming cursor 503 at the center portion of the specific region 505 when the specific region 505 exists at the reference position, whereby the operation difficulty is set higher when the specific region 505 is moved from the reference position. As a result, a more realistic prediction on the location of a pitched ball can be realized.

Figure 23:
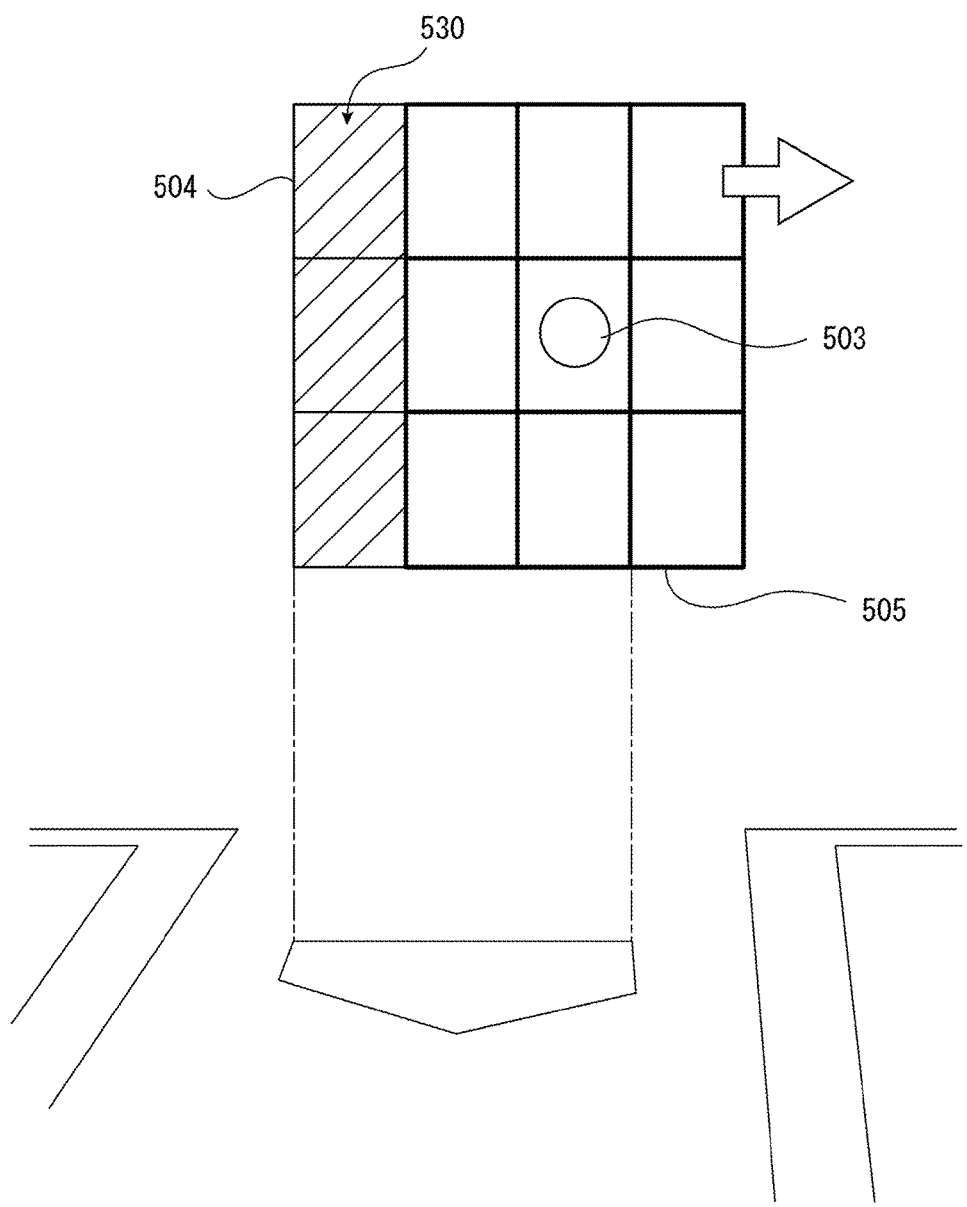
FIG. 23 is an explanatory diagram explaining the case where a blank region is generated by the movement of the specific region.

By the way, as shown in FIG. 23, when the specific region 505 is moved from the strike zone 504 that is the reference position, a blank region 530 is formed, in which the specific region 505 at the reference position before being moved is not overlapped with the specific region 505 after being moved. In FIG. 23, the blank region 530 is shown by hatching. In FIG. 23, since the specific region 505 is moved from the position of the strike zone 504 to the outside of a right-handed batter, the blank region 530 is formed on the inside.

Similarly, when the specific region 505 is moved from the position of the strike zone 504 to the inside of the right-handed batter, the blank region 530 is formed on the outside. When the specific region 505 is moved from the position of the strike zone 504 to the high side of a right-handed batter, the blank region 530 is formed on the low side, and when the specific region 505 is moved from the position of the strike zone 504 to the low side of a right-handed batter, the blank region 530 is formed on the high side. In the following, how to deal with this blank region 530 is explained.

Figure 24:
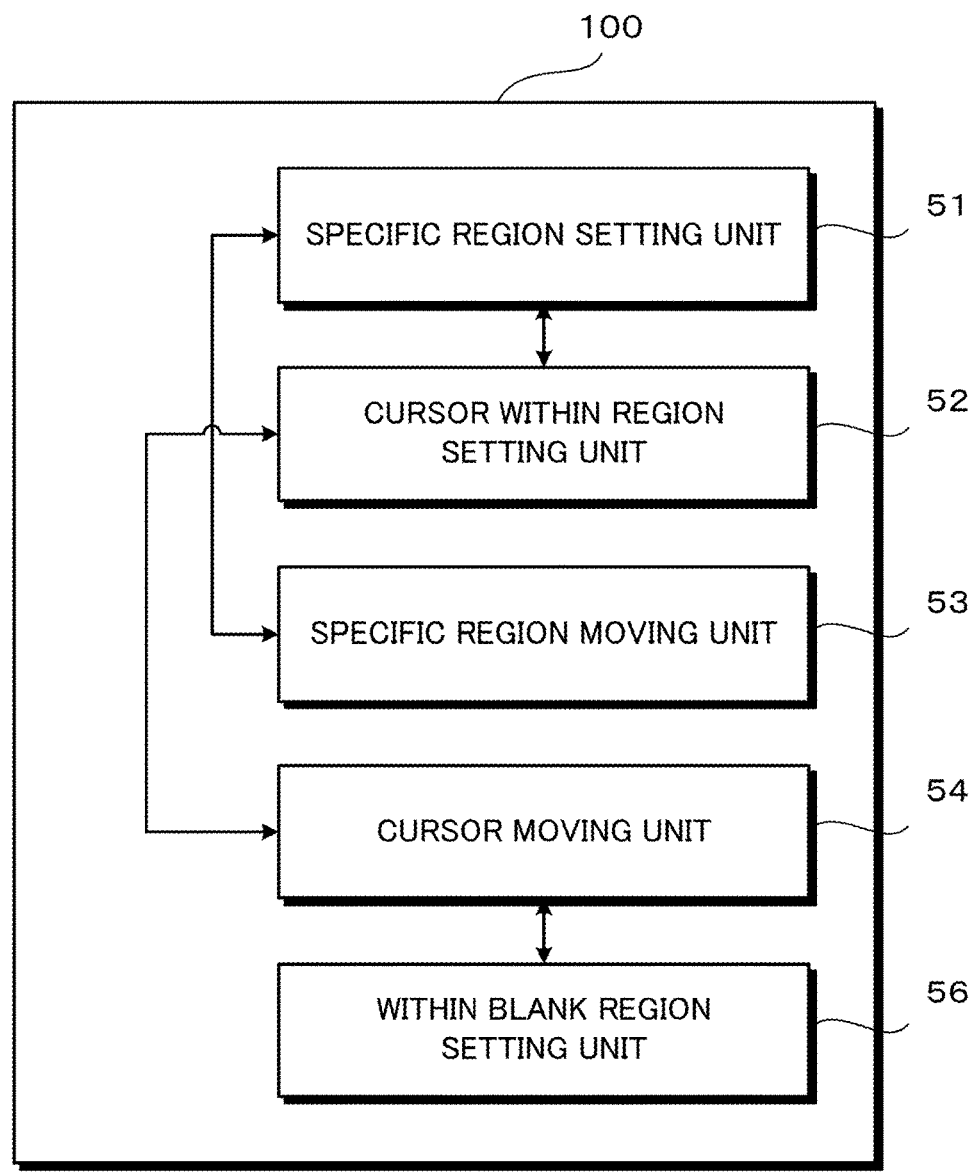
FIG. 24 is a functional block diagram illustrating another example of the major configuration of the game device.

It is preferable that the game device 100 further comprises a within blank region setting unit 56 as shown in the functional block diagram of FIG. 24. This within blank region setting unit 56 has the function of setting the size of the aiming cursor 503 within the blank region 530, formed as a result of moving the specific region 505 from the reference position, to be still smaller than the minimum size of the aiming cursor 503 within the specific region 505 after being moved. Namely, in the blank region 530, the size of the aiming cursor 503 is set such that the difficulty level of a batting operation becomes higher than the maximum difficulty level of a batting operation within the specific region 505.

Figure 25:
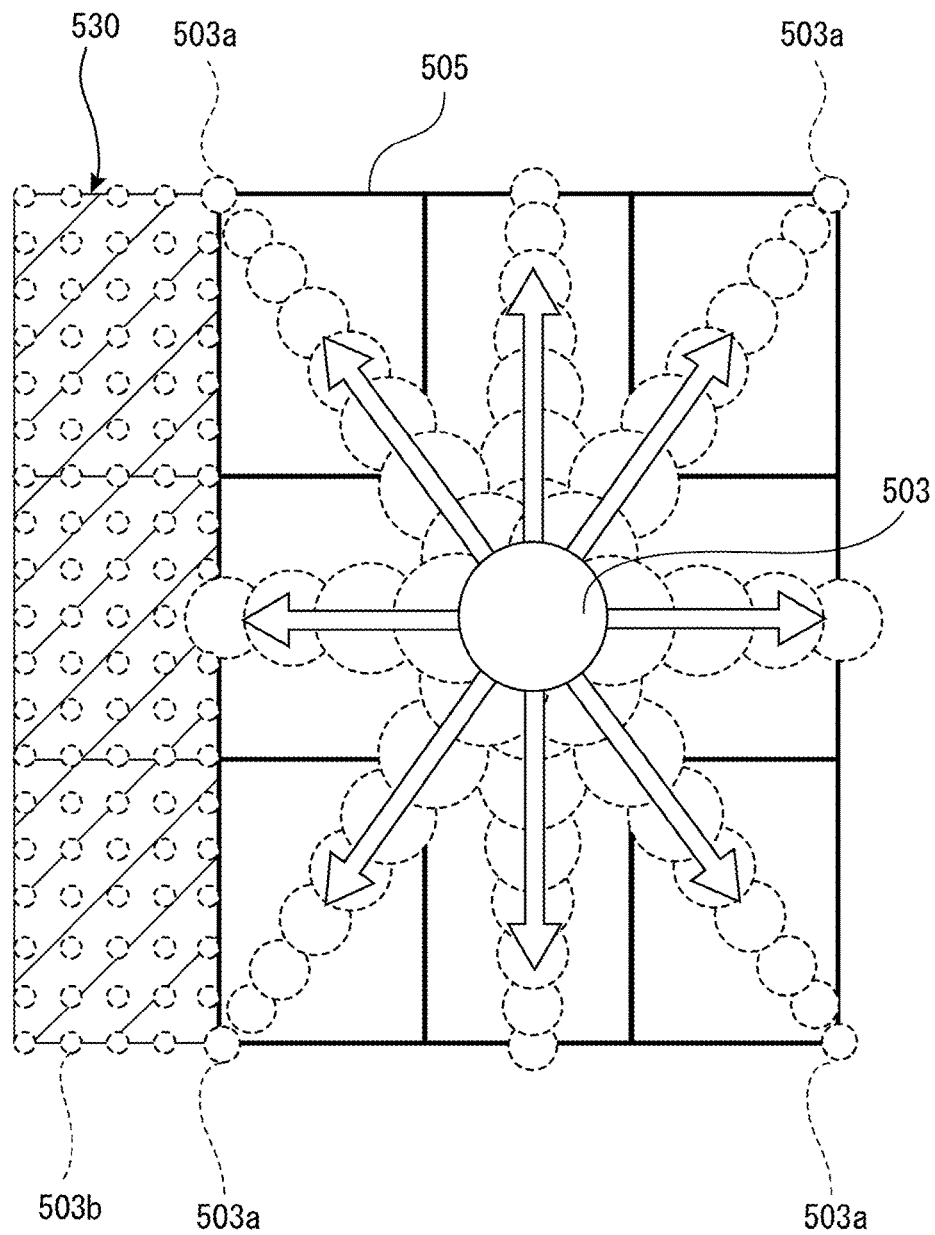
FIG. 25 is an explanatory diagram illustrating an example of the setting of the respective sizes of the aiming cursor within the specific region and the blank region.

For instance, as shown in FIG. 25, in the case of setting the size of the aiming cursor 503 within the specific region 505 such that the more the location of the aiming cursor 503 is away from the center of the specific region 505, the smaller the size of the aiming cursor 503 becomes, the aiming cursor 503a within the specific region 505 has the minimum size when the aiming cursor 503a locates at any of the four corners of the specific region 505. In this case, the size of the aiming cursor 503b in the blank region 530 is set to be still smaller than the size of the aiming cursor 503a at any of the four corners.

In the example of FIG. 25, the aiming cursor 503b has a fixed size at any location within the blank region 530. However, the size of the aiming cursor 503b is not limited to this. For instance, the size of the aiming cursor 503b may be set such that the more the location of the aiming cursor 503b is away from the center portion of the specific region 505 after being moved, the smaller the size of the aiming cursor 503b becomes.

According to the foregoing configuration wherein the size of the aiming cursor 503 within the blank region 530 formed as a result of moving the specific region 505 from the strike zone 504 that is the reference position is set to be still smaller than the minimum size of the aiming cursor 503 within the specific region 505 after being moved, it is possible to clarify the disadvantage resulting from a wrong prediction. As a result, it is possible to enhance the user's tension while playing a game and realize improved amusement properties of the game.

According to the foregoing configuration, for instance, in the case where the location of a pitched ball was predicted to be an outside location, but the prediction on the location was wrong, and the ball was thrown in the blank region 530 of the inside location, though the user would have a clear disadvantage, the user would not be completely prohibited from batting for the following reason. That is, the aiming cursor 503 does locate within the blank region 530 but still within the strike zone 504. Therefore, a batting operation itself is permitted, but instead, the difficulty level of the batting operation is increased.

For regions other than the specific region 505 and the blank region 530, the aiming cursor 503 may be set movable or unmovable. In the case where the aiming cursor 503 may be set movable also in the regions other than the specific region 505 and the blank region 530, the size of the aiming cursor 503 in the regions other than the specific region 505 and the blank region 530 may be set still smaller than the size of the aiming cursor 503 in the blank region 530.

Figure 26:
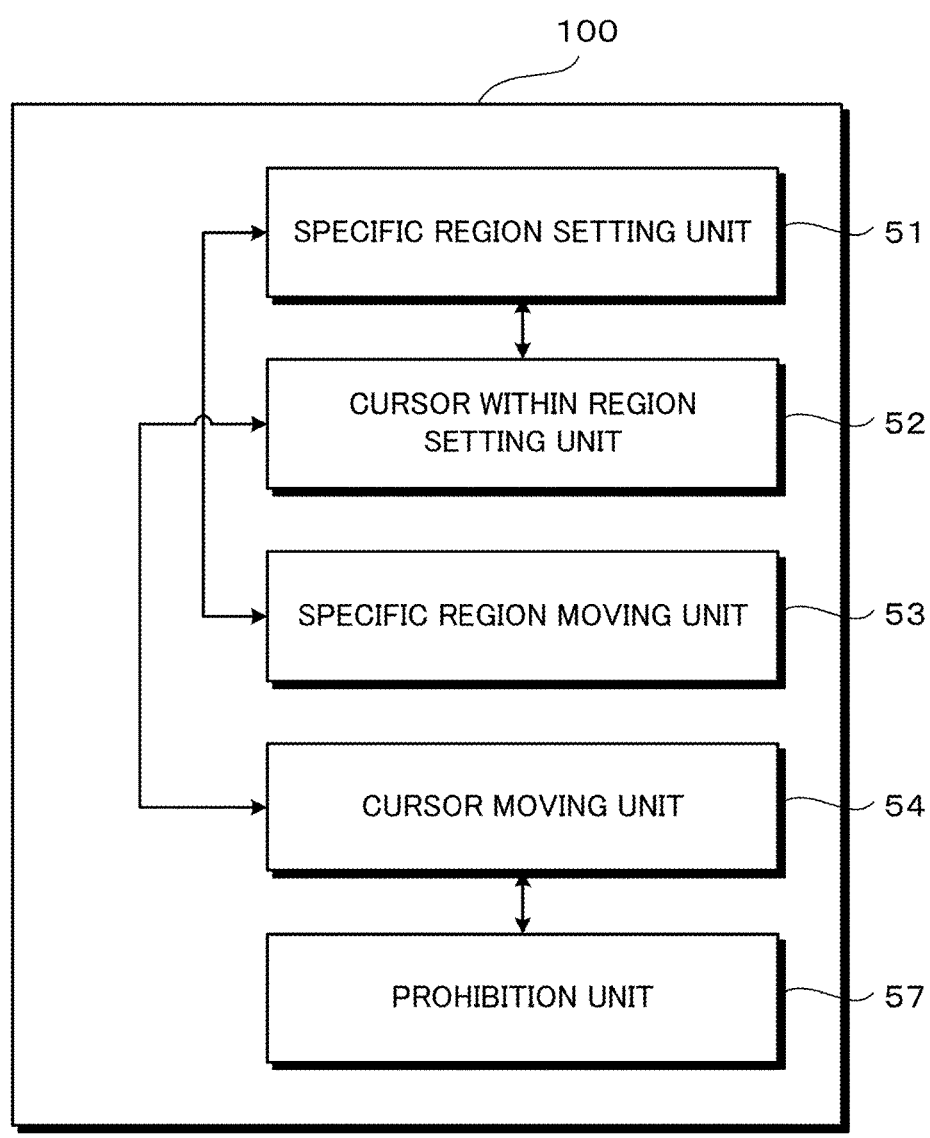
FIG. 26 is a functional block diagram illustrating another example of the major configuration of the game device.

Next, the variation of the configuration of the blank region 530 is explained. It may be configured that the user is prohibited from performing a batting operation in the above blank region 530 so that the disadvantage resulting from the user's wrong prediction on the location of a pitched ball can be more clarified. The game device 100 which realizes this configuration further comprises a prohibition unit 57 as shown in the functional block diagram of FIG. 26.

The prohibition unit 57 has the function of prohibiting a user from applying the function onto a movable object within the blank region 530. In this embodiment, the prohibition unit 57 has the function of prohibiting a user from performing a batting operation (hitting a ball) as an example function with respect to the movable object within the blank region 530.

For the configuration of prohibiting a batting operation in the blank region 530, it may be configured that in the state the aiming cursor 503 locates in the blank region 530, even when a user performs a batting operation by pressing the swing button, the batter character 501 cannot swing a bat, or the batter character 501 can swing a bat but will misses a ball.

According to the foregoing configuration, it is possible to clarify the disadvantage resulting from a wrong prediction on the location of a pitched ball, and to enhance the user's tension while playing a game, thereby realizing improved amusement properties of the game.

For another example of the configuration of prohibiting a batting operation in the blank region 530, it may be configured that the aiming cursor 503 cannot be moved in the blank region 530 from the first. In this case, the prohibition unit 57 has the function of prohibiting the movement of the aiming cursor 503 in the blank region 530.

According to the foregoing configuration, since a user cannot perform an operation of moving the aiming cursor 503 in the blank region 530, it is possible to make the user more clearly recognize the disadvantage resulting from a wrong prediction on the location of a pitched ball. As a result, it is possible to more enhance the user's tension while playing a game, thereby realizing still more improved game properties.

Next, explained is the configuration wherein based on the user's operation of moving the aiming cursor 503, the specific region 505 is moved automatically according to the location of the aiming cursor 503. The specific region moving unit 53 of the game device 100 has the function of moving the specific region 505 along with the movement of the aiming cursor 503 according to the user's operation of moving the aiming cursor 503 before the movement of the movable object (ball in this embodiment) is started such that the aiming cursor 503 after being moved locates at the center portion of the specific region 505.

According to the foregoing configuration, before the pitcher character 502 releases a ball, when a user moves the aiming cursor 503 by operating the controller 19 or the like, the specific region 505 is moved in association with the movement of the aiming cursor 503 such that the aiming cursor 503 always locates at the center of the specific region 505.

Figure 27:
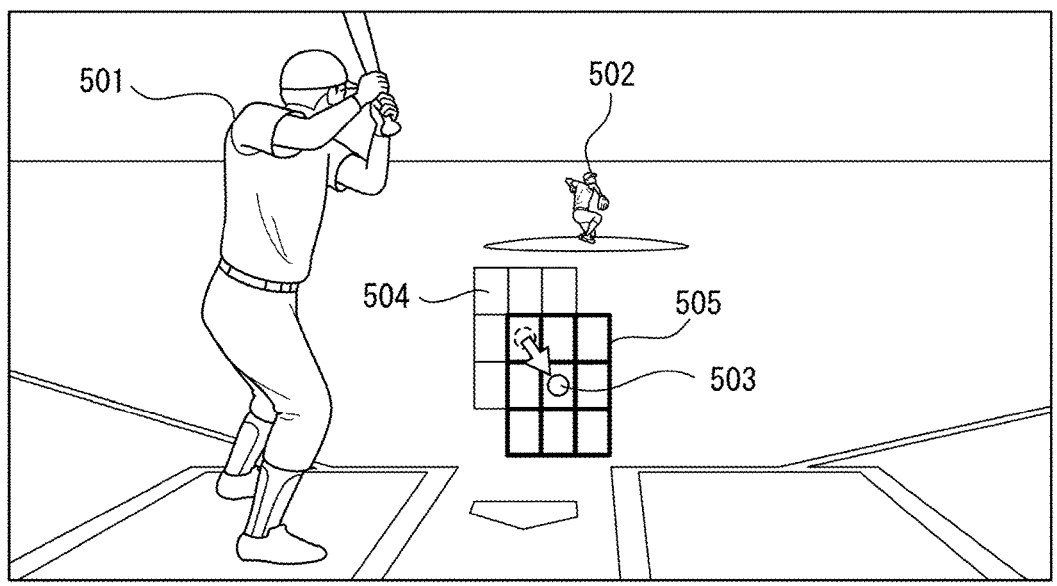
FIG. 27 is an explanatory diagram illustrating an example of the game screen where the specific region is moved to the lower and outside direction in sync with the movement of the aiming cursor.

For instance, as shown in FIG. 6, assumed that the specific region 505 is initialized at the position of the strike zone 504, and the aiming cursor 503 locates at the center portion of the specific region 505. From this state, when the aiming cursor 503 is moved to the low-and-outside by operating the controller 19 or the like, the specific region 505 is also moved so that the aiming cursor 503 locates at the center portion of the specific region 505 as shown in FIG. 27.

As described, even when the specific region 505 is moved in association with the movement of the aiming cursor 503, the setting of the size of the aiming cursor 503 within the specific region 505 is basically maintained.

It is needless to mention that after a ball is released from the pitcher character 502, the specific region 505 cannot be moved, and the location of the aiming cursor 503 is confirmed when the ball is released as the position of the center portion of the specific region 505. For instance, in the case where the aiming cursor 503 locates in the low-and-outside portion of the default position when a ball is released from the pitcher character 502, the specific region 505 is also moved to the lower outside direction as shown in FIG. 27. It is therefore possible for the user to perform a batting operation with a conscious (expectation) of a low-and-outside pitch.

Also in this configuration, it is preferable that the specific region 505 is made invisible after a ball is released from the pitcher character 502 to clarify that the specific region 505 cannot be moved, and also not to disturb a batting operation.

In this configuration, a user is allowed to move the aiming cursor 503 to an arbitrary location by a unit of, for instance, a dot. It is therefore possible for the user to move the specific region 505 to an arbitrary location in association with the movement of the aiming cursor 503.

As described, according to the foregoing configuration, until a ball is released from the pitcher character 502, when a user performs an operation of moving the aiming cursor 503, the specific region 505 can be moved automatically in associated with the movement of the aiming cursor 503 according to the location of the aiming cursor 503 after being moved. Therefore, the user only needs to move the aiming cursor 503 to the predicted location of a pitched ball before the ball is released from the pitcher character 502. As described, only by performing the operation of moving the aiming cursor 503, the specific region 505 can be moved in association with the movement of the aiming cursor 503, thereby simplifying the user's operation.

Next, explained is a variation of the configuration wherein the specific region 505 can be moved automatically only by performing the operation of moving the aiming cursor 503. In the above, explanations have been given through the example in which until the ball is released from the pitcher character 502, the specific region 505 can be moved in association with the movement of the aiming cursor 503. Alternatively, it may be configured as follows. That is, until the ball is released from the pitcher character 502, even when the aiming cursor 503 is moved, the specific region is not moved, and the specific region 505 is moved according to the location of the aiming cursor 503 only when the ball is released from the pitcher character 502.

For instance, as shown in FIG. 6, in the case where the specific region 505 is initialized at the position of the strike zone 504, the specific region 505 is fixed to the position of the strike zone 504 until just before the ball is released from the pitcher character 502. Then, for instance, at the timing the ball is released from the pitcher character 502, if the aiming cursor 503 locates at the outside portion of the strike zone 504 at the initial position, the specific region 505 is moved automatically to the outside direction as shown in FIG. 10.

Also in the foregoing configuration, when a user only performs an operation of moving the aiming cursor 503 to the predicted location of a pitched ball before a ball is released from the pitcher character 502, the positioning of the specific region 505 is performed automatically, thereby simplifying the user's operation.

Other Embodiment

In each of the foregoing embodiments, explanations have been given through the example in which the initial position (reference position) of the specific region 505 on the screen is set to the position of the strike zone 504. However, the initial position of the specific region 505 is not limited to this. For instance, as illustrated in FIG. 10, the specific region 505 may be initialized to the position at which the coordinate of the center portion of the specific region 505 is displaced to the outside direction from the center portion of the strike zone 504 by a unit square. Alternatively, as illustrated in FIG. 12, the specific region 505 may be initialized to the position at which the coordinate of the center portion of the specific region 505 is displaced to the inside direction from the center portion of the strike zone 504 by a unit square. Here, the length of the unit square corresponds to ⅓ of the length in the horizontal direction of the strike zone 504. Similarly, the specific region 505 may be initialized to the position at which the coordinate of the center portion of the specific region 505 is displaced to upwards or downwards from the center portion of the strike zone 504 by a unit square.

For instance, show in FIG. 10, in the case where the reference position of the specific region 505 is set to the position displaced to the outside direction from the center portion by one unit square, when the user predicts the location of a pitched ball to be an outside location, it is not necessary to move the specific region 505.

Alternatively, it may be configured to allow a user to specify (set) the reference position arbitrarily to which the specific region 505 is initialized. For instance, the user on the batter character side predicts that a strategy of the opponent user on the pitcher character side is a combination of mainly outside pitches, the user only needs to specify the reference position to the outside portion of the specific region 505 at the initial position as shown in FIG. 10. In this way, the specific region 505 needs to be moved only when the predicted location of a pitched ball is other location than the outside location, thereby reducing the number of times the operation of moving the specific region 505 is performed.

Furthermore, in the case where it is predicted that the opponent user on the pitcher character side made different strategies on combinations of pitches between the right-handed batter and the left-handed batter, it may be configured to allow the user on the batter character side to set beforehand the reference position of the specific region 505 for the right-handed batter and the reference position of the specific region 505 on the left-handed batter respectively.

In the configuration wherein the user specifies the reference position of the specific region 505, a user performs an operation of specifying the reference position on a setting screen (not shown) by using the controller 19 or the like. On the basis of this operation, the game device 100 stores the information on the specified reference position (coordinate information on the screen, etc.) in a memory device (memory 18 or the like), and then applies this reference position. In this configuration, in the case where the reference position of the specific region 505 is not specified by the user, the default reference position (for instance, the position in which the center portion of the specific region 505 coincides with the center portion of the strike zone 504) can be applied.

In each of the foregoing embodiments, the specific region 505 is configured to have the same size and the same shape (rectangular) as those of the strike zone 504. However, the size and the shape of the specific region 505 are not limited to these. For instance, the specific region 505 may be set larger or smaller than the strike zone 504. Similarly, the shape of the specific region 505 is not limited to the rectangular shape, and the specific region 505 may have, for instance, a circular or oval shape.

In each of the foregoing embodiments, explanations have been given through the example in which the present invention is applied to the baseball game. However, an applicable game is not limited to the baseball game. In each of the foregoing embodiments, a variety of games can be applied in which some function is applied to a movable object, such as a soccer game, a tennis game or the like. In the following, shown is an application example to a soccer game.

In a penalty shootout of the soccer game, a goalkeeper as an example of the first character catches or knocks away a ball (an example of a movable object) released (kicked) by a kicker character as an example of the second character. The goalkeeper character can catch or knock away the ball by the user's operation of moving the aiming cursor to be superimposed on the ball released from the kicker character.

In this soccer game, the specific region setting unit 51 of the game device 100 sets as the specific region, a region on the screen, in which the goalkeeper character can catch or knock away a ball. For instance, this specific region is initialized to the position around the center of the standing position of the goalkeeper character.

For instance, the size of the specific region 505 can be set to have a slightly smaller area than the area of the entire goal. Here, when the goalkeeper character has a high ability parameter, the size of the specific region 505 may be set to have the same area as the goal. Furthermore, the size of the specific region 505 may be set such that the lower the ability parameter of the goalkeeper character is, the smaller the area of the specific region 505 is. As described, the size of the specific region 505 may be changed according to the parameter of a character.

Then, as shown below, the cursor within region setting unit 52 of the game device 100 sets the size of the aiming cursor in the specific region such that the size of the aiming cursor is changed according to the location of the aiming cursor within the specific region. Namely, in the specific region, since it is the easiest for a goalkeeper to catch a ball at the center portion of the specific region, the aiming cursor may be set to have a maximum size at the center portion of the specific region, and the size of the aiming cursor becomes smaller from the center portion towards the periphery of the specific region. Furthermore, in view of that it is easier for a goalkeeper to touch a ball with a hand than with a leg, the size of the aiming cursor may be set larger in the upper portion of the specific region than the lower portion of the specific region.

When user operating the goalkeeper character predicts that the kicker character will kick a ball to the right side of the goal, the user performs an operation of moving the specific region to the right before the ball is sent from the kicker character. As a result, the specific region moving unit 53 of the game device 100 moves the specific region on the screen while maintaining the relative relationship between the locations of the aiming cursor within the specific region and the sizes of the aiming cursor.

In this case, if the user's prediction on the location of a kicked ball is correct, and the kicker character actually kicks the ball in the direction the specific region is moved, the user will have an advantage that the ball can be caught with a relatively large aiming cursor. On the other hand, if the user's prediction on the location of a kicked ball is wrong, and the kicker character actually kicks the ball in a direction other than the direction the specific region is moved, the user will have a disadvantage that the ball can be caught only with a relatively small aiming cursor. Also in this soccer game, it is possible to reflect the tactics between a kicker and a goalkeeper in the real world to soccer games realistically as in the case of the baseball game.

Next, shown is an application example to a tennis game. When serving in tennis, a receiver character as an example of the first character returns a ball as an example of the movable object sent from a server character as an example of the second character. The user operating the receiver character can return a ball by moving the aiming cursor to be superimposed onto the served ball. In this tennis game, the region in which the receiver player can receive a ball may be set as the specific region on the screen. For instance, the specific region is initialized to the position around the center of the standing position of the receiver character.

In view of that it is easier for a receiver character to receive a ball which comes on the side of the receiver character's hand holding a racket than a ball which comes right in front of the receiver character, for instance, the size of the aiming cursor may be set larger at position slightly displaced from the center portion to the side of the hand holding the racket. The size of the aiming cursor may be further set such that the more the aiming cursor locates away from the above position at which the size of the aiming cursor is maximized, the smaller the size of the aiming cursor becomes.

Then, the user operating the receiver character predicts the location of the ball served, and performs an operation of moving the specific region to the location predicted. In this case also, the specific region is moved while maintaining the relative relationship between the locations of the aiming cursor within the specific region and the sizes of the aiming cursor. Also in this tennis game, it is possible to reflect the tactics between a server and a receiver in the real world to tennis games realistically as in the case of the baseball game.

Figure 28:
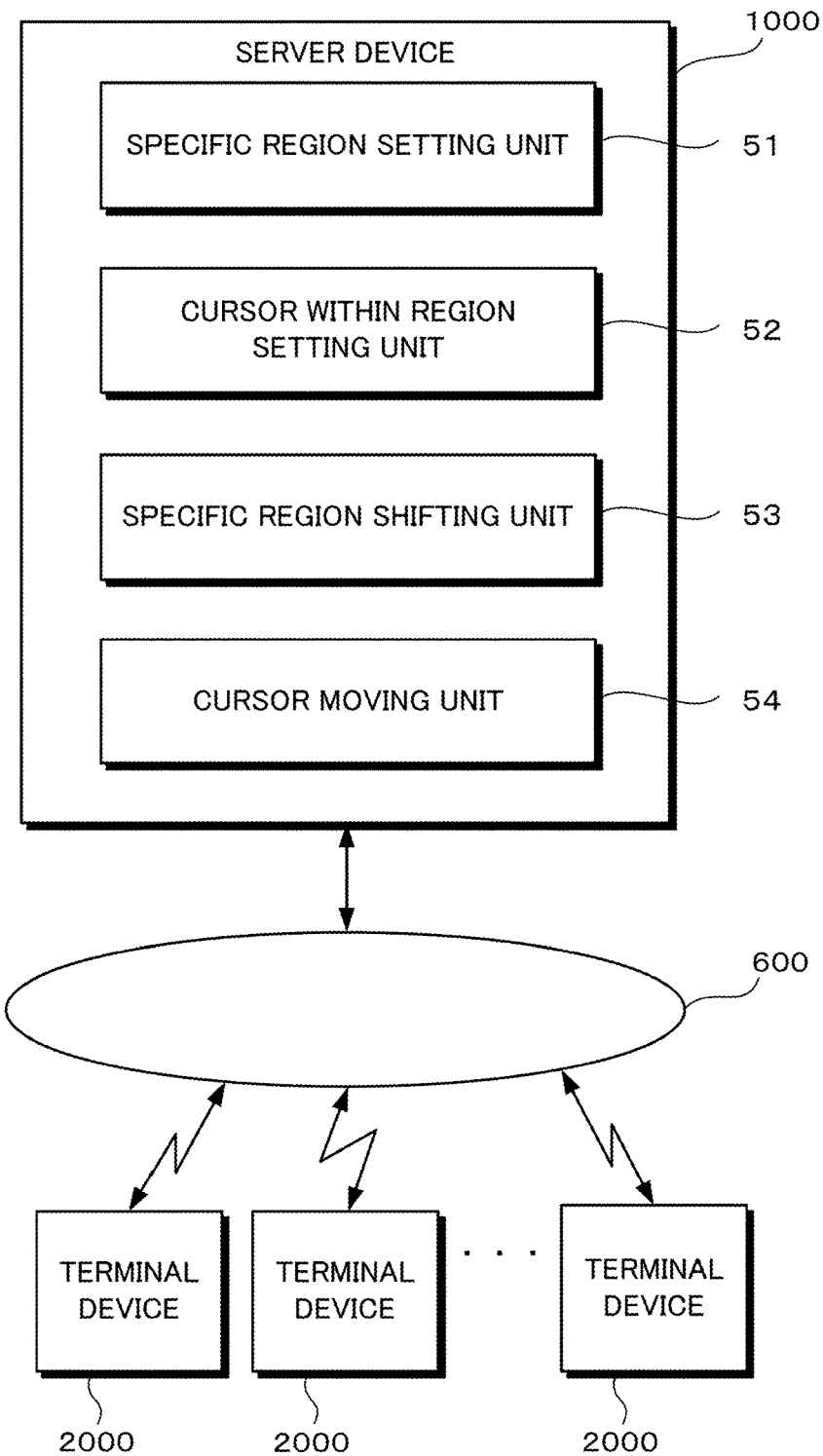
FIG. 28 is a block diagram illustrating a configuration of a game system.

In each of the foregoing embodiments, explanations have been given through the configuration wherein a game program is executed in a game device 100 operated by a user. The present embodiment is also applicable to a game system wherein a game program is executed by the server device according to a game input operation by the terminal device and the server device transmits the result of execution to a terminal device of each user. The configuration example of this game system is shown in FIG. 28. As shown in FIG. 28, this game system comprises a server device 1000 disposed on a network 600 such as an internet, and a terminal device 2000 of each user communicably connected to the server device 1000 via the network 600.

The server device 1000 provides the user with a service of a so-called cloud gaming, in which game images as a result of executing the game are transmitted to the terminal device 2000, for instance, in a streaming format. In the service mode of providing this cloud gaming, there is no need to download or install game-dedicated software to the terminal device 2000 of the user, and as long as the environment which connects the terminal device 2000 to the network 600 can be ensured, the user can casually enjoy the game service provided by the server device 1000 anywhere.

For the hardware configuration of the server device 1000 and the terminal device 2000, the general configuration of a computer comprising a CPU, a ROM, a RAM, an auxiliary storage device, a communication interface may be adopted. The server device 1000 may have the same functional configuration as that of the game device 100 which comprises the specific region setting unit 51, the cursor within region setting unit 52, the specific region moving unit 53 and the cursor moving unit 54. The server device 1000 may further comprise the batting result determination unit 55, the within blank region setting unit 56, the prohibition unit 57, the cursor outside region setting unit 58, etc. As described, the server device 1000 having the same function as the game device 100 also exhibits similar function and effect to those of the game device 100.

Moreover, the server device 1000 and the terminal device 2000 can receive and transmit various kinds of data by mutually communicating to each other. Both of the server device 1000 and the terminal device 2000 are information processing devices (computers), each comprising a CPU, a ROM, a RAM, an auxiliary storage device, a communication interface, etc., and have similar hardware configurations. Therefore, in the game system comprising the server device 1000 and the terminal device 2000, it is only required that at least either the server device 1000 or the terminal device 2000 has respective units of the game device 100, which have been explained in each of the above embodiments. Namely, the respective functions of the game device 100 may be distributed to the server device 1000 and the terminal device 2000. In this configuration, similar function and effect to those of the previous embodiment are exhibited.

For the configuration having the storage control function of storing various kinds of information in the storage device, since the storage device itself is not included in the configuration, the storage device may be provided irrespective of inside or outside the game device, the server device or the game system. For instance, the storage device can be the RAM 5 or the memory 18 of the game device 100, the RAM or the auxiliary storage device of the server device, or a file server (on-line storage) or the like having other configuration from the game device 100 or the server device.

The respective configurations explained in the above embodiments may be applied by appropriately combining any of the configurations.

Moreover, the computer-readable programs according to this embodiment are recorded in various computer-readable non-transitory recording mediums such as a hard disk, optical disc (CD-ROM, DVD-ROM, or the like), flexible disk, and semiconductor memory, and the programs are read from the recording medium and executed by the CPU of the game server. Moreover, the means for providing the program to the game server is not limited to the foregoing recording mediums, and the program can also be provided to the game server via a communication network such as the internet.

As explained in the above, the outline of the game devices, etc., of this embodiment is as follows.

1) As described above, the game device according to one aspect of the present invention is a game device for controlling a game in which a function is applied to a movable object by superimposing an aiming cursor on the movable object, the game device comprising: a cursor moving unit for moving the aiming cursor according to a user's operation; a specific region setting unit for setting a specific region on a screen, in which the aiming cursor is movable; a cursor within region setting unit for setting a size of the aiming cursor within the specific region so as to change the size of the aiming cursor according to a location of the aiming cursor within the specific region; and a specific region moving unit for moving the specific region according to a user's operation before a movement of the movable object is started.

The game controlled by the game device of the foregoing configuration is a game in which a function is applied to a movable object by superimposing the aiming cursor onto the movable object. Examples of the function include hitting back, catching or crushing the movable object. Examples of such games include a baseball game in which the aiming cursor is adjusted onto a ball as an example of the movable object, and a hitting the ball is performed as an example of the function. The present invention is applicable not only to baseball games, but also to various other games in which a certain function is applied to a movable object, such as soccer games or tennis games.

In the following, explained is an example in which the present invention is applied to a baseball game. In the baseball game, the aiming cursor is also referred to as a meet cursor, which indicates a region in which a ball can be hit by a batter character. A user performs an operation of moving the aiming cursor such that the aiming cursor is superimposed onto the ball thrown by the pitcher character. The cursor moving unit moves the aiming cursor according to a user's operation. Here, the size of the aiming cursor is not fixed but is changed according to the location on the screen (coordinate) as explained below.

In this game device, the specific region setting unit sets the specific region on a screen, in which the aiming cursor is movable. The initial position on the screen, the size and the shape of the specific region can be set arbitrarily. Additionally, the aiming cursor may be configured to be movable also in the outside of the specific region, or configured to be immovable in the outside of the specific region. Then, the cursor within region setting unit sets the size of the aiming cursor within the specific region so as to change the size of the aiming cursor according to the location of the aiming cursor within the specific region.

In an example of a baseball game, it is configured that the specific region is formed at a prescribed position on the screen, such as the position of the strike zone, and the size of the aiming cursor is changed according to the location of the aiming cursor within the specific region. As an example, it may be set such that the aiming cursor has a maximum size at the center portion of the specific region, and the size of the aiming cursor is changed such that the more the aiming cursor is away from the center portion of the specific region, the smaller the size of the aiming cursor becomes. In this configuration, reflected to games is the situation of the baseball in the real world, i.e., it is generally easy to hit a middle pitch at a center portion of the strike zone but difficult to hit a pitch at an end portion of the strike zone. In this case, when seen from the pitcher character side, an advantageous condition can be generated simply by aiming an end portion of the strike zone. However, if any countermeasure is not provided, only the pitcher character side would have an advantage. In response, according to this configuration, a user is allowed to move the specific region by the user's operation in addition to the concept of the prediction on the location of a pitched ball on the batter character side. Namely, the game device according to this embodiment comprises the specific region moving unit for moving the specific region according to a user's operation before the movement of the movable object is started.

In the above example, the user can make a prediction (can be conscious of) the location of a pitched ball and move the specific region from the strike zone before the movement of a ball (an example of the movable object) is started. For instance, when the user predicts the location of a pitched ball to be an outside location, irrespectively of the movement of the specific region, the setting made in the inside of the specific region (the setting of the size of the aiming cursor, which is changed according to the location of the aiming cursor within the specific region) is basically maintained. Therefore, it is possible to hit an outside pitch as if hitting a middle pitch at the center portion of the strike zone. On the contrary, as a result of moving the specific region from the strike zone, it becomes difficult to hit a middle pitch at the center portion of the strike zone. Namely, if the user's prediction on the location of a pitched ball is correct, it becomes easy to hit a pitched ball at the end portion of the strike zone, which is originally disadvantageous for a batter character. Therefore, it is possible to avoid such undesirable condition that only the pitcher character side will have an advantage. It is therefore possible to more precisely and realistically reflect the tactics between a pitcher and a batter in the real world to games. As a result, a game with high amusement properties can be realized by reflecting the user's prediction on the location of the movable object realistically.

2) In the above configuration, it is preferable that the cursor within region setting unit sets the size of the aiming cursor within the specific region so that the more the specific region is away from a center portion of the specific region, the smaller the size of the aiming cursor is.

According to the foregoing configuration, the aiming cursor has the maximum size at the center portion of the specific region, where it is the easiest to perform a batting operation or the like. Therefore, by moving the specific region on the basis of the center portion (reference position) of the specific region so that the center portion the specific region is positioned at the predicted location, a user can reflect the prediction on the location of the movable object to games, thereby realizing an improved user's operability. For instance, in a baseball game, when a user (on the batter character side) predicts the location of a next pitch to be a low-and-outside location, the user moves the specific region so that the center portion thereof is positioned to in a low-and-outside portion.

Moreover, in this case, the difficulty level of a batting operation is changed in proportion to the distance between an arrival location of the movable object within the specific region and the center portion of the specific region. This distance indicates the level of accuracy of the prediction such that the shorter the distance is, the more accurate the prediction is, and the easier the batting operation is. On the other hand, the shorter the distance is, the smaller the size of the aiming cursor is, and the more difficult the batting operation is. As described, the accuracy of the prediction can be reflected to the difficulty level of a batting operation.

3) In the foregoing configuration, it is preferable that the specific region setting unit initializes the specific region at a reference position on the screen.

According to the foregoing configuration, the initial position (default position) before the specific region is moved by the specific region moving unit is always fixed to the reference position (for instance, the position of the strike zone in the case of a baseball game). Therefore, it is possible for a user to recognize the position of the specific region with ease, thereby improving the user's operability.

4) In the foregoing configuration, it is preferable that the game is a baseball game or a softball game; and the specific region is set to coincide with a strike zone at the reference position.

According to the foregoing configuration, since the specific region at the reference position coincides with the strike zone, it is not necessary to move the specific region when the user predicts the location of a pitched ball to be a middle location, and the specific region should be moved only when the user predicts the location of the pitched ball to be other than the middle location. As described by realizing the prediction on the location of a pitched ball based on the reference position of the strike zone, it is possible to significantly improve the user's operability.

5) In the foregoing configuration, it is preferable that the cursor within region setting unit sets the size of the aiming cursor at a center portion of the specific region when the specific region is moved from the reference position to be smaller than the size of the aiming cursor at the center portion of the specific region when the specific region exists at the reference position.

Namely, the prediction on the location of the movable object is made on the basis of the user's consciousness to the end. Therefore, the cursor within region setting unit sets the size of the aiming cursor such that the size of the aiming cursor at a center portion of the specific region in the case where the specific region is moved from the reference position (for instance, the position of the strike zone) is smaller than the size of the aiming cursor at a center portion of the specific region in the case where the specific region exists at the reference position.

6) In the foregoing configuration, it is preferable to further comprise a within blank region setting unit for setting the size of the aiming cursor within a blank region when the specific region is moved from the reference position, the blank region being a region of the specific region before being moved at the reference position, which is not overlapped with the specific region after being moved, so that the size of the aiming cursor within the blank region is still smaller than a minimum size of the aiming cursor within the specific region after being moved.

As a result of moving the specific region from the reference position (for instance, the position of the strike zone), a blank region is formed, in which the specific region at the reference position before being moved is not overlapped with the specific region after being moved. By setting the size of the aiming cursor in this blank region to be smaller than the minimum size of the aiming cursor within the specific region after being moved, for instance, it is possible to clarify the disadvantage resulting from a wrong prediction on the location of the movable object. As a result, it is possible to enhance the user's tension while playing a game and realize improved amusement properties of the game.

7) In the foregoing configuration, it is preferable to further comprise a prohibition unit for prohibiting applying a function to the movable object within a blank region when the specific region is moved from the reference position, the blank region being a region of the specific region before being moved at the reference position, which is not overlapped with the specific region after being moved.

For the configuration of prohibiting applying a function to the movable object in the blank region, for example, in the case of a baseball game, it may be configured that in the state the aiming cursor locates within the blank region, even when a user performs a batting operation by pressing a swing button, a batter character cannot swing a bat, or the batter character can swing a bat but will miss a ball. Alternatively, as described below in the configuration 8), it may be configured to prohibit the movement of the aiming cursor into the blank region.

According to the foregoing configuration, for example, an operation of hitting a movable object or the like is prohibited in the blank region, and a disadvantage resulting from a wrong prediction on the location of the movable object is clarified. As a result, the user's tension while playing a game can be enhanced, thereby realizing improved amusement properties of the game.

8) In the foregoing configuration, it is preferable that the prohibition unit prohibits the aiming cursor from being moved into the blank region.

According to the foregoing configuration, since a user cannot perform an operation of moving the aiming cursor in the blank region, it is possible to make the user more clearly recognize the disadvantage resulting from a wrong prediction on the location of the movable object.

9) In the foregoing configuration, it is preferable to further comprise a cursor outside region setting unit for setting the size of the aiming cursor outside the specific region to be smaller than the size of the aiming cursor that locates at a boundary portion within the specific region.

By the way, also in a baseball in the real world, it is more difficult to hit a pitched ball outside the strike zone than a pitched ball in the strike zone. However, it is still possible to skillfully hit a bad ball outside the strike zone. In view of this, in the foregoing configuration, the aiming cursor is configured to be movable also in the outside of the specific region; on the other hand, the size of the aiming cursor is set to be smaller than the size within the specific region so that an operation of hitting a movable object or the like becomes more difficult in the outside of the specific region, thereby realizing an improved game in a term of reality.

10) In the foregoing configuration, it is preferable that the game is a game in which a first character (for instance, a batter character) operated by a user applies the function to the movable object released from a second character (for instance, a pitcher character).

According to the foregoing configuration, a game in a match (confrontation) mode between the first character (batter character or the like) and the second character (pitcher character or the like) can be realized.

11) In the foregoing configuration, it is preferable that the cursor within region setting unit adjusts a setting of the size of the aiming cursor within the specific region based on a parameter of the first character.

Examples of the parameter of the first character include parameters related to the strong location or weak location for a batter character. In the foregoing configuration, the setting of the size of the aiming cursor within the specific region is adjusted according to the strong location, the weak location or the like of the first character. For instance, in the case of the first character to whose strong location is the high-and-inside location, and weak location is the low-and-outside location, the setting of the size distribution of the aiming cursor within the specific region is adjusted such that the size of the aiming cursor in a high-and-inside portion becomes larger than the default size, while the size of the cursor in a low-and-outside portion becomes smaller than the default size. As a result, it is possible to reflect the parameter of the first character to the difficulty level of an operation of hitting the movable object or the like within the specific region, thereby realizing improved amusement properties of the game.

12) In the foregoing configuration, it is preferable that the specific region moving unit moves the specific region according to a user's operation of directly moving the specific region before the movement of the movable object is started.

According to the foregoing configuration, an input operation for the prediction on the location of the movable object is performed beforehand by performing the operation of directly moving the specific region. Therefore, it is possible to clarify the position of the specific region on the screen as the location of the movable object predicted by the user.

13) In the foregoing configuration, it is preferable that the specific region moving unit moves the specific region according to a user's operation of moving the aiming cursor before the movement of the movable object is started, so as to locate the aiming cursor after being moved at a center portion of the specific region.

As described, according to the foregoing configuration, until a movement of the movable object is started, when a user performs an operation of moving the aiming cursor, the specific region can be moved automatically in associated with the movement of the aiming cursor according to the location of the aiming cursor after being moved. As described, only by performing the operation of moving the aiming cursor, the specific region can be moved in association with the movement of the aiming cursor, thereby simplifying the user's operation.

14) A game device according to another aspect of the present invention is a game device for controlling a baseball game or a softball game, in which a hitting of a ball object thrown by a pitcher character is performed when a user who operates a batter character superimposes an aiming cursor on the ball object, the game device comprising: a cursor moving unit for moving the aiming cursor according to a user's operation; a specific region setting unit for setting in a strike zone, a specific region in which the aiming cursor is movable; a cursor within region setting unit for setting a size of the aiming cursor within the specific region so that the more the specific region is away from a center portion of the specific region, the smaller the size of the aiming cursor is; and a specific region moving unit for moving the specific region from the strike zone according to a user's operation before the pitcher character throws the ball object.

15) A game system according to yet another aspect of the present invention is a game system which comprises a terminal device used by a first user uses and a terminal device used by a second user, and which controls a game in which a function is applied to a movable object operated by the second user by making an aiming cursor operated by the first user superimpose on the movable object, the game system comprising: a cursor moving unit for moving the aiming cursor according to a first user's operation; a specific region setting unit for setting a specific region on a screen, in which the aiming cursor is movable; a cursor within region setting unit for setting a size of the aiming cursor within the specific region so as to change the size of the aiming cursor according to a location of the aiming cursor within the specific region; and a specific region moving unit for moving the specific region according to a first user's operation before a movement of the movable object is started.

16) A recording medium according to yet another aspect of the present invention is a non-transitory computer-readable recording medium having recorded thereon a program for causing a computer to operate as the game device having any of the foregoing configurations, which causes the computer to function as respective units of the game device.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A game device for controlling a game in which a function is applied to a movable object by superimposing an aiming cursor on the movable object, comprising:
 a cursor moving unit for moving the aiming cursor according to a user's operation;

a specific region setting unit for setting a specific region on a screen, wherein the aiming cursor is movable in the specific region and a size of the aiming cursor in the specific region is changed by changing a local position of the aiming cursor in the specific region;

a cursor within region setting unit which sets the size of the aiming cursor in the specific region according to the local position of the aiming cursor in the specific region in accordance with a setting which defines a relative relationship between the local position and the size of the aiming cursor in the specific region; and a specific region moving unit for moving the specific region according to a user's operation before a movement of the movable object is started.

2. The game device according to claim 1, wherein:
the cursor within region setting unit sets the size of the aiming cursor the specific region so that the more the aiming cursor is away from a center portion of the specific region, the smaller the size of the aiming cursor is.

3. The game device according to claim 1, wherein:
the specific region setting unit initializes the specific region at a reference position on the screen.

4. The game device according to claim 3, wherein:
the game is a baseball game or a softball game; and
the specific region is set to coincide with a strike zone at the reference position.

5. The game device according to claim 3, wherein:
the cursor within region setting unit sets the size of the aiming cursor at a center portion of the specific region when the specific region is moved from the reference position to be smaller than the size of the aiming cursor at the center portion of the specific region when the specific region exists at the reference position.

6. The game device according to claim 3, further comprising:
a within blank region setting unit for setting the size of the aiming cursor within a blank region when the specific region is moved from the reference position, the blank region being a region of the specific region before being moved at the reference position, which is not overlapped with the specific region after being moved, so that the size of the aiming cursor the blank region is still smaller than a minimum size of the aiming cursor the specific region after being moved.

7. The game device according to claim 3, further comprising:
a prohibition unit for prohibiting applying a function to the movable object within a blank region when the specific region is moved from the reference position, the blank region being a region of the specific region before being moved at the reference position, which is not overlapped with the specific region after being moved.

8. The game device according to claim 7, wherein:
the prohibition unit prohibits the aiming cursor from being moved into the blank region.

9. The game device according to claim 1, further comprising:
a cursor outside region setting unit for setting the size of the aiming cursor outside the specific region to be smaller than the size of the aiming cursor that locates at a boundary portion the specific region.

10. The game device according to claim 1, wherein:
the game is a game in which a first character operated by a user applies the function to the movable object released from a second character.

11. The game device according to claim 10, wherein:
the cursor within region setting unit adjusts a setting of the size of the aiming cursor the specific region based on a parameter of the first character.

12. The game device according to claim 1, wherein:
the specific region moving unit moves the specific region according to a user's operation of directly moving the specific region before the movement of the movable object is started.

13. The game device according to claim 1, wherein:
the specific region moving unit moves the specific region according to a user's operation of moving the aiming cursor before the movement of the movable object is started, so as to locate the aiming cursor after being moved at a center portion of the specific region.

14. A game device for controlling a baseball game or a softball game, in which a hitting of a ball object thrown by a pitcher character is performed when a user who operates a batter character superimposes an aiming cursor on the ball object, comprising:

a cursor moving unit for moving the aiming cursor according to a user's operation;

a specific region setting unit for setting in a strike zone, a specific region wherein the aiming cursor is movable in the specific region and a size of the aiming cursor in the specific region is changed by changing a local position of the aiming cursor in the specific region;

a cursor within region setting unit for setting the size of the aiming cursor in the specific region so that the more the aiming cursor is away from a center portion of the specific region, the smaller the size of the aiming cursor is in accordance with a setting which defines a relative relationship between the local position and the size of the aiming cursor in the specific region; and a specific region moving unit for moving the specific region from the strike zone according to a user's operation before the pitcher character throws the ball object.

15. A game system which comprises a terminal device used by a first user uses and a terminal device used by a second user, and which controls a game in which a function is applied to a movable object operated by the second user by making an aiming cursor operated by the first user superimpose on the movable object, the game system comprising:

a cursor moving unit for moving the aiming cursor according to a first user's operation;

a specific region setting unit for setting a specific region on a screen, wherein the aiming cursor is movable in the specific region and a size of the aiming cursor in the specific region is changed by changing a local position of the aiming cursor in the specific region;

a cursor within region setting unit which sets the size of the aiming cursor in the specific region according to the local position of the aiming cursor in the specific region in accordance with a setting which defines a relative relationship between the local position and the size of the aiming cursor in the specific region; and a specific region moving unit for moving the specific region according to a first user's operation before a movement of the movable object is started.

16. A non-transitory computer-readable recording medium having recorded thereon a program for causing a computer to operate as the game device according to claim 1, which causes the computer to function as respective units of the game device.

17. The game device according to claim 1, wherein:
the setting is maintained irrespectively of the movement of the specific region by the specific region moving unit.

18. The game device according to claim 14, wherein:
the setting is maintained irrespectively of the movement of the specific region by the specific region moving unit.

19. The game system according to claim 15, wherein:
the setting is maintained irrespectively of the movement of the specific region by the specific region moving unit.

\* \* \* \* \*